(12) United States Patent
Rong

(10) Patent No.: US 11,196,501 B2
(45) Date of Patent: Dec. 7, 2021

(54) CODEBOOK FEEDBACK METHOD AND APPARATUS

(71) Applicant: Huawei Technologies Co., Ltd., Shenzhen (CN)

(72) Inventor: Lu Rong, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 239 days.

(21) Appl. No.: 16/521,004

(22) Filed: Jul. 24, 2019

(65) Prior Publication Data
US 2019/0349105 A1 Nov. 14, 2019

Related U.S. Application Data

(63) Continuation of application No. PCT/CN2018/071665, filed on Jan. 5, 2018.

(30) Foreign Application Priority Data

Jan. 26, 2017 (CN) .......................... 201710061662.3

(51) Int. Cl.
*H04J 3/16* (2006.01)
*H04B 7/0417* (2017.01)
(Continued)

(52) U.S. Cl.
CPC .......... *H04J 3/1694* (2013.01); *H04B 7/0417* (2013.01); *H04B 7/0478* (2013.01);
(Continued)

(58) Field of Classification Search
CPC ... H04J 3/1694; H04B 7/0417; H04B 7/0478; H04B 7/0634; H04B 7/0456; H04W 72/0446; H04W 72/046
See application file for complete search history.

(56) References Cited

U.S. PATENT DOCUMENTS

2012/0176939 A1* 7/2012 Qu .................. H04L 5/0048
370/255
2013/0329664 A1 12/2013 Kim et al.
(Continued)

FOREIGN PATENT DOCUMENTS

CN 103036601 A 4/2013
CN 103314614 A 9/2013
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 13)," 3GPP TS 36.211 V13.2.0, Jun. 2016, 168 pages.
(Continued)

*Primary Examiner* — Hassan Kizou
*Assistant Examiner* — Abdullahi Ahmed
(74) *Attorney, Agent, or Firm* — Slater Matsil, LLP

(57) ABSTRACT

A codebook feedback method and an apparatus. In the method, antenna ports corresponding to first-type reference signals of a cell in which a user equipment (UE) is located are grouped into at least two antenna port groups, and each antenna port group includes at least one antenna port, and the method includes receiving, by the UE, a first-type reference signal that is corresponding to a target antenna port group and that is sent by a base station, where the target antenna port group is an antenna port group in the at least two antenna port groups, obtaining, by the UE, precoding matrix indicator (PMI) information of the first-type reference signal corresponding to the target antenna port group and sending, by the UE, the PMI information to the base station.

19 Claims, 11 Drawing Sheets

(51) Int. Cl.
*H04B 7/0456* (2017.01)
*H04W 72/04* (2009.01)
*H04B 7/06* (2006.01)

(52) U.S. Cl.
CPC ..... *H04W 72/046* (2013.01); *H04W 72/0446* (2013.01); *H04B 7/0634* (2013.01)

(56) References Cited

U.S. PATENT DOCUMENTS

| | | |
|---|---|---|
| 2014/0086285 A1 | 3/2014 | Yang et al. |
| 2014/0323144 A1* | 10/2014 | Kim .................. H04B 7/0408 455/452.1 |
| 2016/0080052 A1 | 3/2016 | Li et al. |
| 2016/0156401 A1 | 6/2016 | Onggosanusi et al. |
| 2016/0277081 A1 | 9/2016 | Wei et al. |
| 2016/0329939 A1 | 11/2016 | Xu et al. |
| 2018/0254813 A1* | 9/2018 | Gao .................... H04B 7/0632 |
| 2018/0262246 A1* | 9/2018 | Faxer .................... H04B 7/063 |
| 2018/0316405 A1* | 11/2018 | Li ........................ H04B 7/0626 |
| 2019/0036581 A1* | 1/2019 | Zhang .................. H04B 7/0413 |
| 2019/0045460 A1* | 2/2019 | Muruganathan ..... H04B 7/0482 |
| 2019/0103902 A1* | 4/2019 | Gao .................... H04B 7/0632 |

FOREIGN PATENT DOCUMENTS

| | | |
|---|---|---|
| CN | 104009785 A | 8/2014 |
| CN | 104335501 A | 2/2015 |
| CN | 104753646 A | 7/2015 |
| CN | 105391479 A | 3/2016 |
| CN | 105659508 A | 6/2016 |
| EP | 3370348 A1 | 9/2018 |
| WO | 2015178699 A1 | 11/2015 |

OTHER PUBLICATIONS

Lopez-Perez, D. et al., "Improved Frequency Reuse Schemes with Horizontal Sector Offset for LTE," 2013 IEEE 24th International Symposium on Personal, Indoor and Mobile Radio Communications: Mobile and Wireless Networks, 2013, 6 pages.

"Analog/digital/hybrid beamforming for massive MIMO," Agenda item: 7.1.6, Source: Samsung, Document for Discussion, 3GPP TSG RAN WG1 #85, R1-164018, Nanjing, China, May 23-27, 2016, 4 pages.

Sesia, S. et al., "LTE The UMTS Long Term Evolution from Theory to Practice," Second Edition, John Wiley and Sons Ltd, Jul. 2011, 794 pages.

* cited by examiner

CODEBOOK FEEDBACK METHOD AND APPARATUS

CROSS-REFERENCE TO RELATED APPLICATIONS

This application is a continuation of International Application No. PCT/CN2018/071665, filed on Jan. 5, 2018, which claims priority to Chinese Patent Application No. 201710061662.3, filed on Jan. 26, 2017. The disclosures of the aforementioned applications are hereby incorporated by reference in their entireties.

TECHNICAL FIELD

This application relates to the communications field, and in particular, to a codebook feedback method and an apparatus.

BACKGROUND

A cell-specific reference signal (CRS) may be used by a receive end to feed back codebook information to a transmit end. Specifically, a base station sends CRSs of a cell managed by the base station to user equipment (UE) in the cell. The UE performs channel estimation on channels corresponding to all the CRSs of the cell based on the received CRSs of the cell, then obtains precoding matrix indicator (PMI) information based on a channel estimation result, and feeds back the PMI information to the base station. A length of a precoding vector indicated by a PMI is a quantity of antenna ports corresponding to all the CRSs of the cell.

In the foregoing method, the length of the precoding vector is the quantity of antenna ports corresponding to all the CRSs of the cell. In this way, a larger quantity of antenna ports corresponding to the CRSs of the cell indicates a longer precoding vector, and consequently codebook design is relatively complex.

SUMMARY

Embodiments of the present invention provide a codebook feedback method and an apparatus, so as to resolve a problem that codebook design is relatively complex.

According to a first aspect, a codebook feedback method is provided. Antenna ports corresponding to first-type reference signals of a cell in which UE is located are grouped into at least two antenna port groups, and each antenna port group includes at least one antenna port. The method may include receiving, by the UE, a first-type reference signal that is corresponding to a target antenna port group and that is sent by a base station, where the target antenna port group is an antenna port group in the at least two antenna port groups, obtaining precoding matrix indicator PMI information of the first-type reference signal corresponding to the target antenna port group, and sending PMI information to the base station. It can be learned that in the technical solution, only an M-dimensional (M is a quantity of antenna ports in an antenna port group) codebook set needs to be designed, and therefore a codebook design is relatively simple.

With reference to the first aspect, in a first possible implementation, before the obtaining, by the UE, PMI information of the first-type reference signal corresponding to the target antenna port group, the method may further include receiving, by the UE, at least two second-type reference signals, where each second-type reference signal is corresponding to one of the at least two antenna port groups, and using an antenna port group corresponding to a target second-type reference signal as the target antenna port group, where the target second-type reference signal is a second-type reference signal in the at least two second-type reference signals. In this possible implementation, the second-type reference signal and a correspondence between each second-type reference signal and an antenna port group are designed, so that the UE determines the target antenna port group.

With reference to the first possible implementation of the first aspect, in a second possible implementation, before the using, by the UE, an antenna port group corresponding to a target second-type reference signal as the target antenna port group, the method may further include receiving, by the UE, an indication message sent by the base station, where the indication message is used to indicate a correspondence between each second-type reference signal and an antenna port group in the at least two antenna port groups. During specific implementation, the correspondence may alternatively be preset.

With reference to the first possible implementation of the first aspect or the second possible implementation of the first aspect, in a third possible implementation, if each of the at least two second-type reference signals is time-division multiplexed, time domain resource information of each second-type reference signal is corresponding to one of the at least two antenna port groups, or an index of each second-type reference signal is corresponding to one of the at least two antenna port groups. Certainly, the foregoing correspondence is not limited thereto. For details, refer to the following specific embodiments.

With reference to any one of the first aspect, or the first possible implementation to the third possible implementation of the first aspect, in a fourth possible implementation, the method may further include sending, by the UE, information about the target antenna port group to the base station, where the information about the target antenna port group is used by the base station to determine the target antenna port group. The information about the target antenna port group may include a sequence number of the target antenna port group, a sequence number of the target second-type reference signal, a sequence number of the target antenna port group corresponding to the target second-type reference signal, time domain resource information of the target second-type reference signal, or the like. This implementation provides a manner of explicitly feeding back the target antenna port group.

With reference to any one of the first possible implementation to the third possible implementation of the first aspect, in a fifth possible implementation, if each of the at least two second-type reference signals is time-division multiplexed, the sending, by the UE, the PMI information to the base station may include sending, by the UE, the PMI information to the base station based on a time domain resource location used by the target second-type reference signal. This implementation provides a manner of implicitly feeding back the target antenna port group.

According to a second aspect, a codebook feedback method is provided. Antenna ports corresponding to first-type reference signals of a cell in which UE is located are grouped into N antenna port groups, each antenna port group includes M antenna ports, N is an integer greater than or equal to 2, and M is an integer greater than or equal to 1. The method may include receiving, by the UE, a first-type reference signal of the cell that is sent by a base station, determining precoding matrix indicator PMI information of the first-type reference signal of the cell based on an N-dimensional inter-group codebook set and an M-dimensional intra-group codebook set, and sending PMI information to the base station. It can be learned that in the technical solution, only the N-dimensional inter-group codebook set and the M-dimensional intra-group codebook set need to be designed, and therefore, a codebook design is relatively simple.

With reference to the second aspect, in a first possible implementation, the PMI information includes first PMI information and second PMI information, where the first PMI information is used to indicate a precoding vector in the N-dimensional inter-group codebook set, and the second PMI information is used to indicate a precoding vector in the M-dimensional intra-group codebook set. Correspondingly, the base station may obtain a precoding vector (namely, an N*M-dimensional precoding vector) of the first-type reference signal of the cell based on an N-dimensional precoding vector indicated by the first PMI information and an M-dimensional precoding vector indicated by the second PMI information. This possible implementation may be understood as that the UE feeds back the precoding vector of the first-type reference signal of the cell to the base station in an indirect feedback manner.

With reference to the second aspect, in a second possible implementation, the PMI information is used to indicate an N*M-dimensional precoding vector. It may be understood that the N*M-dimensional precoding vector is a precoding vector of the first-type reference signal of the cell. This implementation may be understood as that the UE feeds back the precoding vector of the first-type reference signal of the cell to the base station in a direct feedback manner.

With reference to the second aspect, or the first possible implementation of the second aspect or the second possible implementation of the second aspect, in a third possible implementation, the method may further include performing, by the UE, point multiplication based on the precoding vector indicated by the first PMI and the precoding vector indicated by the second PMI information, to obtain the precoding vector of the first-type reference signal of the cell, where the precoding vector is N*M-dimensional. Specifically, the UE may perform a Kronecker operation on the precoding vector indicated by the first PMI information and the precoding vector indicated by the second PMI information, to obtain the precoding vector of the first-type reference signal of the cell.

With reference to any one of the second aspect, or the first possible implementation to the third possible implementation of the second aspect, in a fourth possible implementation, the method may further include receiving, by the UE, codebook configuration information sent by the base station, where the codebook configuration information includes at least one of configuration information of the N-dimensional inter-group codebook set and configuration information of the M-dimensional intra-group codebook set, and if the codebook configuration information includes the configuration information of the N-dimensional inter-group codebook set, configuring, by the UE, the N-dimensional inter-group codebook set based on the configuration information of the N-dimensional inter-group codebook set, or if the codebook configuration information includes the configuration information of the M-dimensional intra-group codebook set, configuring, by the UE, the M-dimensional intra-group codebook set based on the configuration information of the M-dimensional intra-group codebook set. This implementation provides a codebook set configuration method. During specific implementation, either of the N-dimensional inter-group codebook set and the M-dimensional intra-group codebook set may be preset.

With reference to any one of the second aspect, or the first possible implementation to the fourth possible implementation of the second aspect, in a fifth possible implementation, the method may further include receiving, by the UE, information about at least two antenna port groups that is sent by the base station, where the information about the at least two antenna port groups is used to indicate grouping information of the antenna ports corresponding to the first-type reference signals. For example, the grouping information may include at least one of N and M.

With reference to any one of the second aspect, or the first possible implementation to the fifth possible implementation of the second aspect, in a sixth possible implementation, N is equal to M, and content of the precoding vector indicated by the first PMI information is different from content of the precoding vector indicated by the second PMI information. It can be learned that in this embodiment of the present invention, an intra-group codebook set and an inter-group codebook set may be separately configured and separately used.

According to a third aspect, a codebook feedback method is provided. Antenna ports corresponding to first-type reference signals of a cell are grouped into at least two antenna port groups, and each antenna port group includes at least one antenna port. The method may include sending, by a base station, a first-type reference signal of the cell, so that UE obtains precoding matrix indicator PMI information of a first-type reference signal corresponding to a target antenna port group, where the target antenna port group is an antenna port group in the at least two antenna port groups, and receiving, by the base station, the PMI information sent by the UE.

With reference to the third aspect, in a first possible implementation, the method may further include sending, by the base station, at least two second-type reference signals to the UE, where each second-type reference signal is corresponding to one of the at least two antenna port groups.

With reference to the first possible implementation of the third aspect, in a second possible implementation, the method may further include sending, by the base station, a correspondence between each second-type reference signal and an antenna port group in the at least two antenna port groups to the UE.

With reference to the first possible implementation or the second possible implementation of the third aspect, in a third possible implementation, each of the at least two second-type reference signals is time-division multiplexed, and time domain resource information of each second-type reference signal is corresponding to one of the at least two antenna port groups, or an index of the second-type reference signal is corresponding to one of the at least two antenna port groups.

With reference to any one of the third aspect, or the first possible implementation to the third possible implementation of the third aspect, in a fourth possible implementation, the method may further include receiving, by the base station, information about a target antenna port that is sent by the UE, and determining the target antenna port group based on the information about the target antenna port.

With reference to any one of the first possible implementation to the fourth possible implementation of the third aspect, in a fifth possible implementation, each of the at least two second-type reference signals is time-division multiplexed, and the method may further include using, by the base station as a target second-type reference signal, a second-type reference signal corresponding to a time domain resource location used when the base station receives the PMI information.

For beneficial effects of the third aspect and the possible implementations of the third aspect, refer to the first aspect and the possible implementations of the first aspect. Details are not described herein again.

According to a fourth aspect, a codebook feedback method is provided. Antenna ports corresponding to first-type reference signals of a cell are grouped into N antenna port groups, each antenna port group includes M antenna ports, N is an integer greater than or equal to 2, and M is an integer greater than or equal to 1. The method may include sending, by a base station, a first-type reference signal of the cell, where the first-type reference signal of the cell is used to instruct UE to determine precoding matrix indicator PMI information of the first-type reference signal of the cell based on an N-dimensional inter-group codebook set and an M-dimensional intra-group codebook set, and send the PMI information to the base station, and receiving, by the base station, the PMI information sent by the UE.

With reference to the fourth aspect, in a first possible implementation, the PMI information includes first PMI information and second PMI information, where the first PMI information is used to indicate a precoding vector in the N-dimensional inter-group codebook set, and the second PMI information is used to indicate a precoding vector in the M-dimensional intra-group codebook set, or the PMI information is used to indicate an N*M-dimensional precoding vector.

With reference to the fourth aspect or the first possible implementation of the fourth aspect, in a second possible implementation, the method may further include sending, by the base station, codebook configuration information to the UE, where the codebook configuration information includes at least one of configuration information of the N-dimensional inter-group codebook set and configuration information of the M-dimensional intra-group codebook set, the configuration information of the N-dimensional inter-group codebook set is used to instruct the UE to configure the N-dimensional inter-group codebook set, and the configuration information of the M-dimensional intra-group codebook set is used to instruct the UE to configure the M-dimensional intra-group codebook set.

With reference to the first possible implementation or the second possible implementation of the fourth aspect, in a third possible implementation, the method may further include performing, by the base station, point multiplication based on the precoding vector indicated by the first PMI and the precoding vector indicated by the second PMI information, to obtain a precoding vector of the first-type reference signal of the cell, where the precoding vector is N*M-dimensional. Specifically, the base station may perform a Kronecker operation on the precoding vector indicated by the first PMI information and the precoding vector indicated by the second PMI information, to obtain the precoding vector of the first-type reference signal of the cell.

With reference to any one of the fourth aspect, or the first possible implementation to the third possible implementation of the fourth aspect, in a fourth possible implementation, the method may further include sending, by the base station, information about at least two antenna port groups to the UE, where the information about the at least two antenna port groups is used to indicate grouping information of the antenna ports corresponding to the first-type reference signals. For example, the grouping information may include at least one of N and M.

With reference to any one of the fourth aspect, or the first possible implementation to the fourth possible implementation of the fourth aspect, in a fifth possible implementation, N is equal to M, and content of the precoding vector indicated by the first PMI information is different from content of the precoding vector indicated by the second PMI information.

For beneficial effects of the fourth aspect and the possible implementations of the fourth aspect, refer to the second aspect and the possible implementations of the second aspect. Details are not described herein again.

According to a fifth aspect, UE is provided. Antenna ports corresponding to first-type reference signals of a cell in which the UE is located are grouped into at least two antenna port groups, and each antenna port group includes at least one antenna port. The UE may include a receiving unit, an obtaining unit, and a sending unit. The receiving unit is configured to receive a first-type reference signal that is corresponding to a target antenna port group and that is sent by a base station, where the target antenna port group is an antenna port group in the at least two antenna port groups. The obtaining unit is configured to obtain precoding matrix indicator PMI information of the first-type reference signal corresponding to the target antenna port group. The sending unit is configured to send the PMI information to the base station.

With reference to the fifth aspect, in a first possible implementation, the receiving unit may be further configured to receive at least two second-type reference signals, where each second-type reference signal is corresponding to one of the at least two antenna port groups. In this case, the UE may further include a determining unit, configured to use an antenna port group corresponding to a target second-type reference signal as the target antenna port group, where the target second-type reference signal is a second-type reference signal in the at least two second-type reference signals.

With reference to the first possible implementation of the fifth aspect, in a second possible implementation, the receiving unit may be further configured to receive an indication message sent by the base station, where the indication message is used to indicate a correspondence between each second-type reference signal and an antenna port group in the at least two antenna port groups.

With reference to the first possible implementation or the second possible implementation of the fifth aspect, in a third possible implementation, each of the at least two second-type reference signals is time-division multiplexed, and time domain resource information of each second-type reference signal is corresponding to one of the at least two antenna port groups, or an index of each second-type reference signal is corresponding to one of the at least two antenna port groups.

With reference to any one of the fifth aspect, or the first possible implementation to the third possible implementation of the fifth aspect, in a fourth possible implementation, the sending unit may be further configured to send information about the target antenna port group to the base station, where the information about the target antenna port group is used by the base station to determine the target antenna port group.

With reference to any one of the first possible implementation to the fourth possible implementation of the fifth aspect, in a fifth possible implementation, each of the at least two second-type reference signals is time-division multiplexed, and the sending unit may be specifically configured to send the PMI information to the base station based on a time domain resource location used by the target second-type reference signal.

According to a sixth aspect, UE is provided. Antenna ports corresponding to first-type reference signals of a cell in which the UE is located are grouped into N antenna port groups, each antenna port group includes M antenna ports, N is an integer greater than or equal to 2, and M is an integer greater than or equal to 1. The UE may include a receiving unit, a determining unit, and a sending unit. The receiving unit is configured to receive a first-type reference signal of the cell that is sent by a base station. The determining unit is configured to determine precoding matrix indicator PMI information of the first-type reference signal of the cell based on an N-dimensional inter-group codebook set and an M-dimensional intra-group codebook set. The sending unit is configured to send the PMI information to the base station.

With reference to the sixth aspect, in a first possible implementation, the PMI information includes first PMI information and second PMI information, where the first PMI information is used to indicate a precoding vector in the N-dimensional inter-group codebook set, and the second PMI information is used to indicate a precoding vector in the M-dimensional intra-group codebook set, or the PMI information is used to indicate an N*M-dimensional precoding vector.

With reference to the first possible implementation of the sixth aspect, in a second possible implementation, the UE may further include an operation unit, configured to perform a Kronecker operation on the precoding vector indicated by the first PMI information and the precoding vector indicated by the second PMI information, to obtain a precoding vector of the first-type reference signal of the cell.

With reference to the sixth aspect, or the first possible implementation or the second possible implementation of the sixth aspect, in a third possible implementation, the receiving unit may be further configured to receive codebook configuration information sent by the base station, where the codebook configuration information includes at least one of configuration information of the N-dimensional inter-group codebook set and configuration information of the M-dimensional intra-group codebook set. The UE may further include a configuration unit, configured to if the codebook configuration information includes the configuration information of the N-dimensional inter-group codebook set, configure the N-dimensional inter-group codebook set based on the configuration information of the N-dimensional inter-group codebook set, or if the codebook configuration information includes the configuration information of the M-dimensional intra-group codebook set, configure the M-dimensional intra-group codebook set based on the configuration information of the M-dimensional intra-group codebook set.

According to a seventh aspect, a base station is provided. Antenna ports corresponding to first-type reference signals of a cell are grouped into at least two antenna port groups, and each antenna port group includes at least one antenna port. The base station may include a sending unit and a receiving unit. The sending unit is configured to send a first-type reference signals of the cell, so that UE obtains precoding matrix indicator PMI information of a first-type reference signal corresponding to a target antenna port group, where the target antenna port group is an antenna port group in the at least two antenna port groups. The receiving unit is configured to receive the PMI information sent by the UE.

With reference to the seventh aspect, in a first possible implementation, the sending unit may be further configured to send at least two second-type reference signals to the UE, where each second-type reference signal is corresponding to one of the at least two antenna port groups.

With reference to the first possible implementation of the seventh aspect, in a second possible implementation, the sending unit may be further configured to send a correspondence between each second-type reference signal and an antenna port group in the at least two antenna port groups to the UE.

With reference to the first possible implementation or the second possible implementation of the seventh aspect, in a third possible implementation, each of the at least two second-type reference signals is time-division multiplexed, and time domain resource information of each second-type reference signal is corresponding to one of the at least two antenna port groups, or an index of the second-type reference signal is corresponding to one of the at least two antenna port groups.

With reference to any one of the seventh aspect, or the first possible implementation to the third possible implementation, in a fourth possible implementation, the receiving unit may be further configured to receive information about a target antenna port that is sent by the UE. The method may further include a determining unit, configured to determine the target antenna port group based on the information about the target antenna port.

With reference to any one of the first possible implementation to the fourth possible implementation of the seventh aspect, in a fifth possible implementation, each of the at least two second-type reference signals is time-division multiplexed, and the base station may further include a determining unit, configured to use, as a target second-type reference signal, a second-type reference signal corresponding to a time domain resource location used when the PMI information is received.

According to an eighth aspect, a base station is provided. Antenna ports corresponding to first-type reference signals of a cell are grouped into N antenna port groups, each antenna port group includes M antenna ports, N is an integer greater than or equal to 2, and M is an integer greater than or equal to 1. The base station may include a sending unit and a receiving unit. The sending unit is configured to send a first-type reference signal of the cell, where the first-type reference signal of the cell is used to instruct UE to determine precoding matrix indicator PMI information of the first-type reference signal of the cell based on an N-dimensional inter-group codebook set and an M-dimensional intra-group codebook set, and send the PMI information to the base station. The receiving unit is configured to receive the PMI information sent by the UE.

With reference to the eighth aspect, in a first possible implementation, the PMI information includes first PMI information and second PMI information, where the first PMI information is used to indicate a precoding vector in the N-dimensional inter-group codebook set, and the second PMI information is used to indicate a precoding vector in the M-dimensional intra-group codebook set, or the PMI information is used to indicate an N*M-dimensional precoding vector.

With reference to the eighth aspect or the first possible implementation of the eighth aspect, in a second possible implementation, the sending unit may be further configured to send codebook configuration information to the UE, where the codebook configuration information includes at least one of configuration information of the N-dimensional inter-group codebook set and configuration information of the M-dimensional intra-group codebook set, the configuration information of the N-dimensional inter-group codebook set is used to instruct the UE to configure the N-dimensional inter-group codebook set, and the configuration information of the M-dimensional intra-group codebook set is used to instruct the UE to configure the M-dimensional intra-group codebook set.

With reference to the first possible implementation of the eighth aspect, in a third possible implementation, the PMI information includes the first PMI information and the second PMI information. The base station may further include an operation unit, configured to perform a Kronecker operation on the precoding vector indicated by the first PMI information and the precoding vector indicated by the second PMI information, to obtain a precoding vector of the first-type reference signal of the cell.

According to a ninth aspect, UE is provided. The UE may implement functions performed by the UE in the codebook feedback method example according to the first aspect or the second aspect. The functions may be implemented by hardware, or may be implemented by executing corresponding software by hardware. The hardware or the software includes modules corresponding to one or more of the foregoing functions.

In a possible design, a structure of the UE includes a processor, a communications bus, and a communications interface. The processor is configured to support the UE in performing a corresponding function in the foregoing method. The communications interface is configured to support communication between the UE and another network element (for example, a base station). The UE may further include a memory. The memory is configured to couple to the processor, and stores program instructions and data necessary for the UE. The communications interface may be specifically a transceiver.

In addition, a computer storage medium is further provided, and is configured to store a computer software instruction corresponding to the codebook feedback method according to the first aspect or the second aspect. The computer software instruction includes a program designed for performing the ninth aspect.

According to a tenth aspect, a base station is provided. The base station may implement functions performed by the base station in the codebook feedback method example according to the third aspect or the fourth aspect. The functions may be implemented by hardware, or may be implemented by executing corresponding software by hardware. The hardware or the software includes modules corresponding to one or more of the foregoing functions.

In a possible design, a structure of the base station includes a processor, a communications bus, and a communications interface. The processor is configured to support the base station in performing a corresponding function in the foregoing method. The communications interface is configured to support communication between the UE and another network element (for example, a base station). The base station may further include a memory. The memory is configured to couple to the processor, and stores program instructions and data necessary for the UE. The communications interface may be specifically a transceiver.

In addition, a computer storage medium is further provided, and is configured to store a computer software instruction corresponding to the codebook feedback method according to the third aspect or the fourth aspect. The computer software instruction includes a program designed for performing the tenth aspect.

It may be understood that any one of the apparatuses or the computer storage media described above is configured to perform a corresponding method described above. Therefore, for beneficial effects that can be achieved by any one of the apparatuses or the computer storage media described above, refer to beneficial effects of the corresponding method described above. Details are not described herein again.

DETAILED DESCRIPTION OF ILLUSTRATIVE EMBODIMENTS

The technical solutions provided in the embodiments of the present invention may be applied to various communications systems, and especially, to a future evolved network such as a 5G communications system. In addition, the technical solutions may be also applied to current 2G, 3G, and 4G communications systems, for example, a long term evolution-advanced (LTE) system, a cellular system related to the 3rd Generation Partnership Project (3GPP), and other similar communications systems. It should be noted that the 5G communications system may include a machine-to-machine (M2M) communication scenario, a macro-micro communication scenario, and the like. These communication scenarios may include but are not limited to communication between UEs, communication between base stations, communication between a base station and UE, and the like. It may be understood that the technical solutions provided in the embodiments of the present invention may be applied to any one of the foregoing communication scenarios. An example in which the technical solutions provided in the embodiments of the present invention are all applied to the base station and the UE is used for description below.

Figure 1:
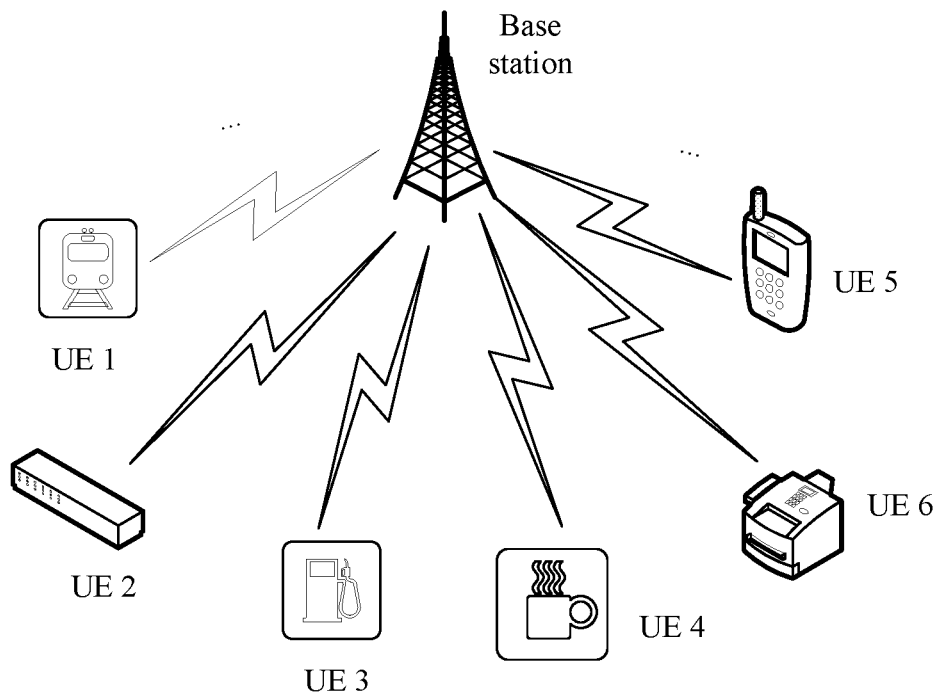
FIG. 1 is a schematic diagram of a system architecture to which a technical solution is applied according to an embodiment of the present invention.

The technical solutions provided in the embodiments of the present invention may be applied to a system architecture shown in FIG. 1. The system architecture may include one or more base stations, each base station may manage one or more cells, and each cell may include one or more UEs. Some or all UEs managed by the base station may feed back codebook information to the base station. In FIG. 1, an example in which the system architecture includes one base station and a plurality of UEs in one cell managed by the base station is used for description.

Figure 2:
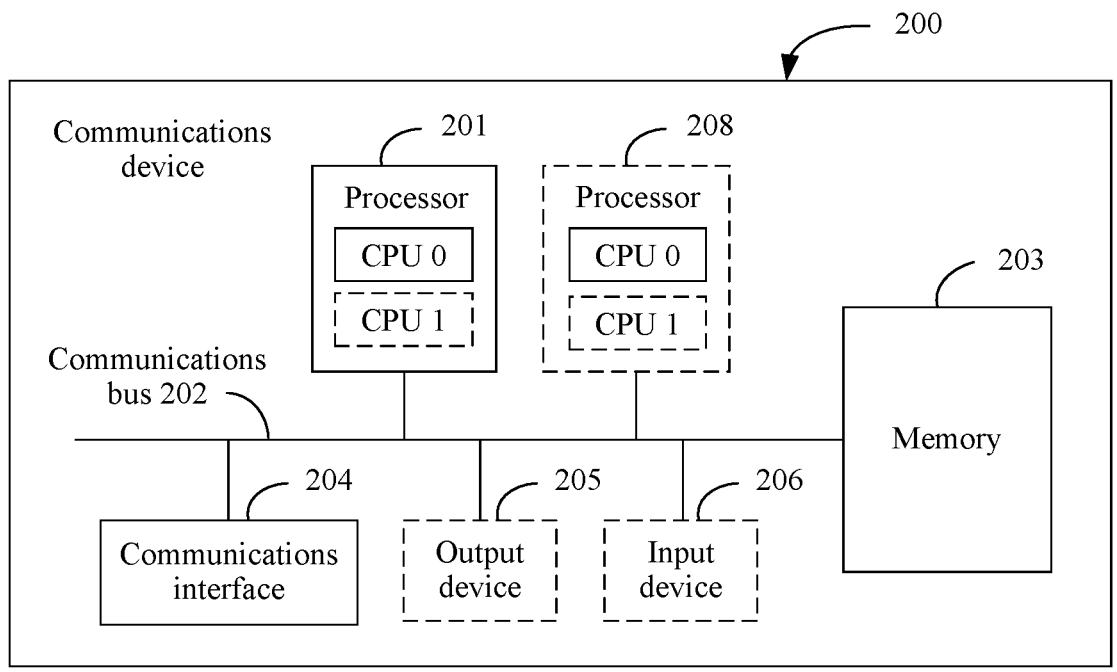
FIG. 2 is a schematic structural diagram of a communications device according to an embodiment of the present invention.

Specifically, the base station and the UE in the system architecture shown in FIG. 1 may be implemented by a communications device (or a system) in FIG. 2.

FIG. 2 is a schematic structural diagram of a communications device according to an embodiment of the present invention. The communications device 200 includes at least one processor 201, a communications bus 202, a memory 203, and at least one communications interface 204.

The processor 201 may be a general-purpose central processing unit (CPU), a microprocessor, an application-specific integrated circuit (ASIC), or one or more integrated circuits configured to control program execution of the solutions in this application.

The communications bus 202 may include a path, to transmit information between the foregoing components.

The communications interface 204 uses any apparatus such as a transceiver to communicate with another device or communications network such as the Ethernet, a radio access network (RAN), or a wireless local area network (WLAN).

The memory 203 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor by using the bus. Alternatively, the memory may be integrated into the processor.

The memory 203 is configured to store application program code for executing the solutions in this application, and execution of the application program code is controlled by the processor 201. The processor 201 is configured to execute the application program code stored in the memory 203, to implement a codebook feedback method according to an embodiment of the present invention.

During specific implementation, in an embodiment, the processor 201 may include one or more CPUs such as a CPU 0 and a CPU 1 in FIG. 2.

During specific implementation, in an embodiment, the communications device 200 may include a plurality of processors such as a processor 201 and a processor 208 in FIG. 2. Each of these processors may be a single-core (single-CPU) processor or a multi-core (multi-CPU) processor. The processor herein may be one or more devices, circuits, and/or processing cores for processing data (such as a computer program instruction).

During specific implementation, in an embodiment, the communications device 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode-ray tube (CRT) display device, or a projector (projector). The input device 206 communicates with the processor 201, and may receive user input in a plurality of manners. For example, the input device 206 may be a mouse, a keyboard, a touchscreen device, or a sensing device.

The communications device 200 may be a general communications device or a dedicated communications device. During specific implementation, the communications device 200 may be a desktop computer, a portable computer, a network server, a personal digital assistant (PDA), a mobile phone, a tablet computer, a wireless terminal device, an embedded device, or a device in a similar structure in FIG. 2. A type of the communications device 200 is not limited in this embodiment of this application.

For ease of understanding of a reader, the following briefly describes related content in this specification.

(1): First-type reference signal: The first-type reference signal is a reference signal used when UE performs channel estimation, and obtains codebook information (namely, PMI information) based on a channel estimation result. The first-type reference signal may include but is not limited to any one of the following reference signals: a CRS, a channel state information-reference signal (CSI-RS), and the like. In addition, the first-type reference signal may also be a newly defined reference signal. A base station usually sends a first-type reference signal at a granularity of a cell. It may be understood that first-type reference signals of different cells managed by one base station are different.

In the embodiments of the present invention, the first-type reference signal may be generated by the base station based on a hardware architecture of hybrid beamforming. Different vendors may use different hardware architectures to implement the technical solutions, and in different scenario conditions, a same vendor may also use different hardware architectures to implement the technical solutions. In other words, in the technical solutions provided in the embodiments of the present invention, the UE does not need to focus on a hardware architecture used on a network side.

Figure 3:
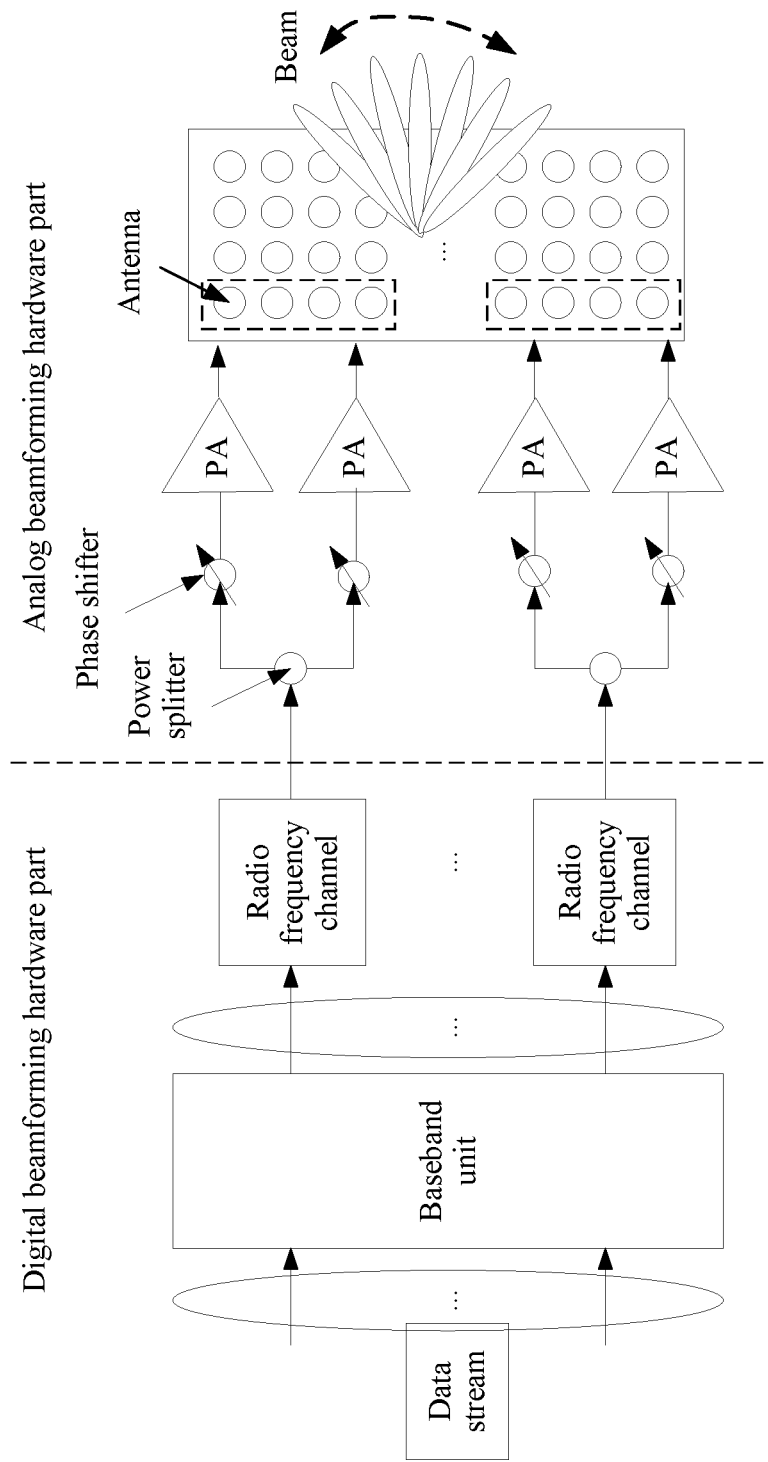
FIG. 3 is a schematic diagram of a hardware architecture of hybrid beamforming according to an embodiment of the present invention.

A hardware architecture of hybrid beamforming is shown in FIG. 3. The hardware architecture of hybrid beamforming includes a digital beamforming hardware part and an analog beamforming hardware part. The digital beamforming hardware part includes a baseband unit, a radio frequency channel (RF chain), and the like. The analog beamforming hardware part includes a power splitter, a phase shifter, a power amplifier (PA), an antenna, and the like. The antenna directionally sends a signal to form a beam. A connection relationship between the components or the modules is shown in FIG. 3. A data stream (data streams) is processed by the baseband unit to form a signal that can be transmitted through the radio frequency channel. After being transmitted through the radio frequency channel, the signal is processed by the power splitter, the phase shifter, the power amplifier, and the like, and then transmitted through the antenna or an analog beam.

(2) At least two antenna port groups: Antenna ports corresponding to first-type reference signals of one cell may be grouped into at least two antenna port groups. Each antenna port group includes at least one antenna port. Each first-type reference signal is corresponding to one antenna port. Quantities of antenna ports included in different antenna port groups may be equal, or may not be equal. An example in which the quantities of antenna ports included in different antenna port groups are equal is used for description below.

A rule of grouping the antenna ports corresponding to the first-type reference signals may be pre-agreed between a receiving party and a sending party, or may be notified to a peer end by using signaling. This is not limited in the embodiments of the present invention. It should be noted that "a first-type reference signal corresponding to an antenna port group" described in this specification is a first-type reference signal corresponding to an antenna port in the antenna port group.

(3) Second-type reference signal: The second-type reference signal is used by UE to select a target antenna port group from at least two antenna port groups corresponding to first-type reference signals of a cell in which the UE is located. The second-type reference signal may include but is not limited to a CRS, a CSI-RS, and the like. In addition, the second-type reference signal may also be a newly defined reference signal.

A rule of grouping the antenna ports corresponding to the first-type reference signals is not limited in the embodiments of the present invention. The following describes methods for grouping antenna ports based on two scenarios.

In an implementation 1, if a quantity of antennas connected to one radio frequency channel of a base station is greater than a quantity of analog beams generated through the radio frequency channel, the base station may send a first-type reference signal by using an analog beam, in other words, one antenna port may be corresponding to one analog beam. In this way, overheads of sending the first-type reference signal can be reduced.

In this case, because the quantity of antennas connected to the radio frequency channel is greater, a beam gain of the analog beam is higher, so as to resolve a problem of coverage in a high-frequency scenario and the like. It may be understood that the analog beam has a particular spatial feature, and analog beams having similar spatial features can be formed through radio frequency channels closer to an antenna in a same analog beam configuration. Therefore, channel features of analog beams, of a plurality of radio frequency channels, that have a same configuration may be measured by using an analog beam of one radio frequency channel. In the embodiments of the present invention, antenna ports corresponding to antennas connected to a plurality of radio frequency channels that share an analog beam are grouped into one antenna port group, and the antenna ports in the antenna port group share a second-type reference signal. In other words, in this case, a quantity of antenna port groups (namely, a quantity of second-type reference signals) may be equal to a quantity of analog beams generated through one radio frequency channel.

Based on this implementation, analog beams corresponding to a same group of antenna ports are in a same direction, in other words, a same group of antenna ports are corresponding to one analog beam, and analog beams corresponding to different groups of antenna ports are in different directions. Because channels corresponding to analog beams in a same direction have similar features, channel quality of a channel determined by using a first-type reference signals corresponding to an antenna port group may reflect channel quality of a channel corresponding to another antenna port group. For a codebook feedback method provided based on this implementation, refer to the following embodiments shown in FIG. 4, FIG. 6, and FIG. 8.

Certainly, in the following embodiments shown in FIG. 4, FIG. 6, and FIG. 8, a manner of grouping antenna ports corresponding to first-type reference signals may not be limited thereto. It may be understood that in all scenarios in which a first-type reference signal is sent by using an analog beam, a codebook may be fed back by using the embodiment shown in FIG. 4, FIG. 6, and FIG. 8. The technical solution in this scenario is referred to as a technical solution 1 below.

In an implementation 2, if a quantity of antennas connected to one radio frequency channel of a base station is less than a quantity of analog beams generated through the radio frequency channel, the base station may send a first-type reference signal by using an antenna, in other words, one antenna port may be corresponding to one antenna. In this way, overheads of sending the first-type reference signal can be reduced. Assuming that there are S radio frequency channels, each radio frequency channel is connected to R antennas, and K analog beams in different directions are generated through each radio frequency channel (in other words, K different analog beams may be generated through each radio frequency channel, where K>R), the base station may send the first-type reference signal by using S*R antennas, where S, R, and K are all integers greater than 1.

In this case, because only one radio frequency signal can be sent once through one radio frequency channel, different antennas need to send radio frequency signals at different moments, so that UE can distinguish between channels corresponding to the different antennas. In the embodiments of the present invention, first-type reference signals are respectively sent on different time resources by using different antenna ports. Optionally, one grouping method is grouping antenna ports corresponding to antennas connected to a same radio frequency channel into one antenna port group. For example, as shown in FIG. 3, antenna ports corresponding to antennas in each dashed-line box may be grouped into one antenna port group. Another grouping method is grouping antenna ports corresponding $r^{th}$ antennas connected to all radio frequency channels into one antenna port group, where $1 \le r \le R$, and r is an integer. As shown in FIG. 3, antenna ports corresponding to first antennas in all dashed-line boxes may be grouped into one antenna port group. For a codebook feedback method provided based on this optional implementation, refer to an embodiment shown in FIG. 9.

Certainly, in the following embodiment shown in FIG. 9, a manner of grouping antenna ports corresponding to first-type reference signals may not be limited thereto. It may be understood that in all scenarios in which a first-type reference signal is sent by using an antenna, a codebook may be fed back by using the embodiment shown in FIG. 9. The technical solution in this scenario is referred to as a technical solution 2 below.

It should be noted that in the hardware architecture of hybrid beamforming, the base station usually sends a data signal by using an analog beam. Because the base station sends the first-type reference signal by using the analog beam in the foregoing implementation 1, codebook conversion is not required. Because the base station sends the first-type reference signal by using the antenna in the foregoing implementation 2, codebook conversion is required. For specific implementation, refer to the following embodiment shown in FIG. 9.

In addition, it should be noted that the technical solutions provided in the embodiments of the present invention may be extended as follows. For some antenna ports, a codebook is fed back by using the technical solution 1, and for the other antenna ports, a codebook is fed back by using the technical solution 2.

For example, for a dual-polarized antenna, spatial features of analog beams in different polarization directions may be different. Alternatively, when a large-scale antenna is constituted by a plurality of antenna arrays that are far from each other, spatial features of analog beams of antenna arrays at different locations may be different. In this case, antenna ports corresponding to first-type reference signals may be grouped into two subsets A and B. For an antenna port in the subset A, a codebook is fed back by using the technical solution 1, and for an antenna port in the subset B, a codebook is fed back by using the technical solution 2.

The technical solutions provided in the embodiments of the present invention are described below with reference to the accompanying drawings.

Figure 4:
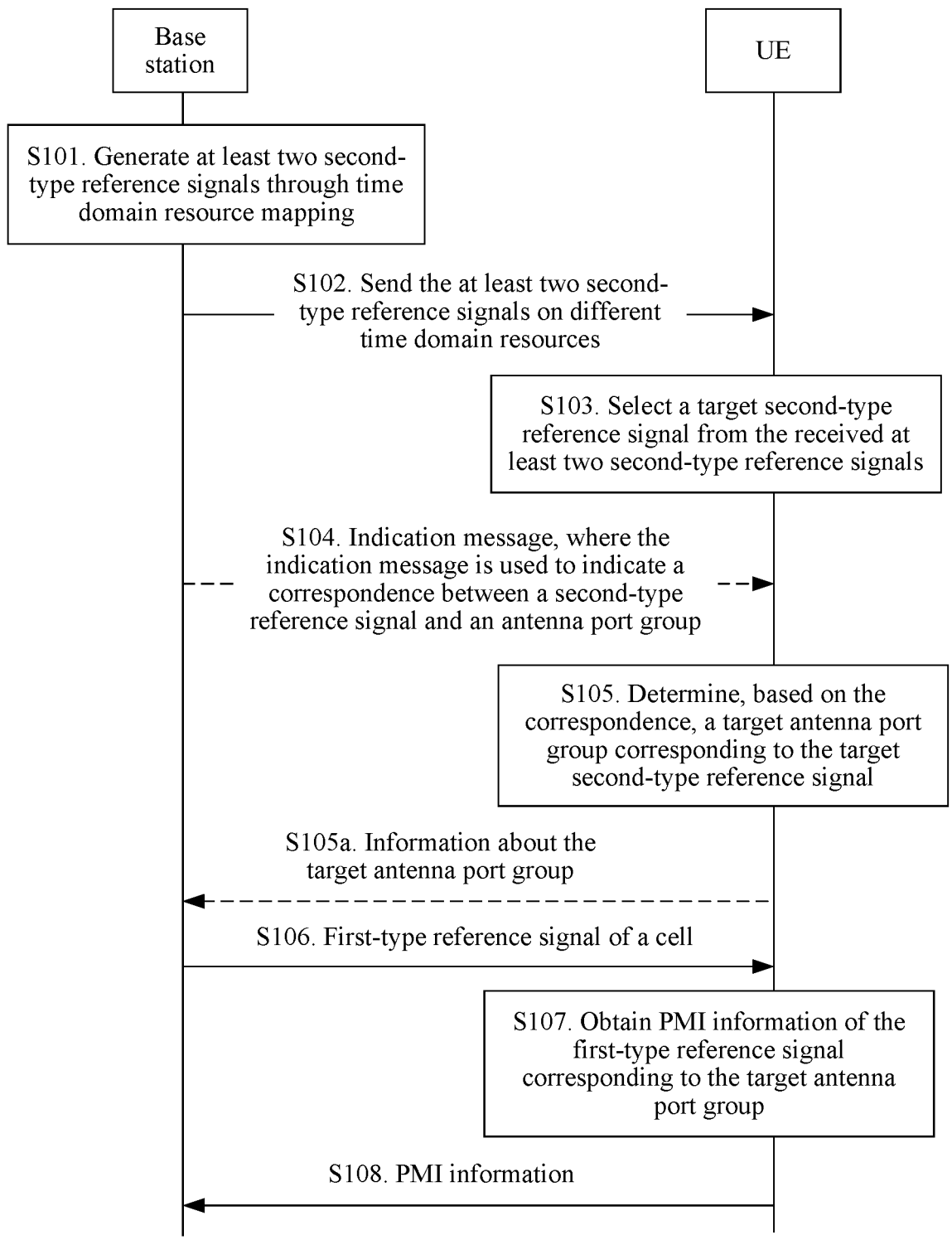
FIG. 4 is a schematic interaction diagram of a codebook feedback method according to an embodiment of the present invention.

FIG. 4 is a schematic interaction diagram of a codebook feedback method according to an embodiment of the present invention. The method shown in FIG. 4 may include the following steps S101 to S108.

S101. A base station generates at least two second-type reference signals through time domain resource mapping.

Figure 5:
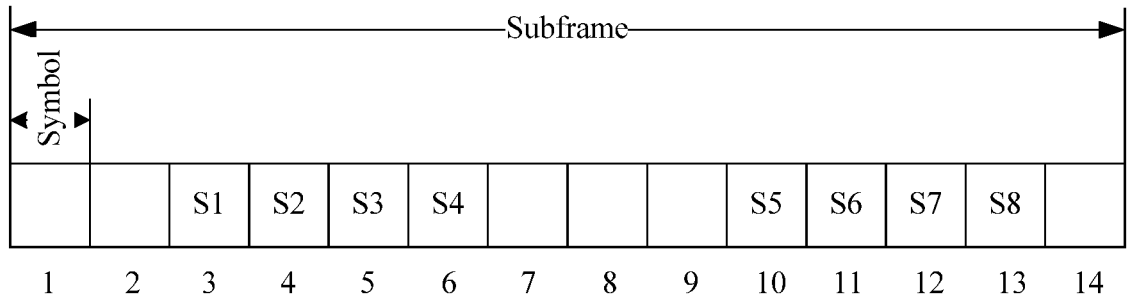
FIG. 5 is a schematic diagram of mapping a second-type reference signal to a time domain resource according to an embodiment of the present invention.

In an example 1, assuming that there are eight second-type reference signals that are respectively denoted as S1 to S8, a schematic diagram of mapping the second-type reference signals to time domain resources may be shown in FIG. 5. In FIG. 5, an example in which one subframe includes 14 orthogonal frequency division multiplexing (orthogonal frequency division multiplexing, OFDM) symbols (which are respectively denoted as 1 to 14) is used for description.

S102. The base station sends the at least two second-type reference signals on different time domain resources, where one second-type reference signal is sent on each time domain resource, and the time domain resource may include but is not limited to a symbol, a slot, a subframe, a frame, or the like.

The base station may send the at least two second-type reference signals to all UEs in one cell managed by the base station. Based on the example 1, S102 may include the base station sends eight second-type reference signals on eight symbols in one subframe, where one second-type reference signal is sent on each symbol.

S103. UE selects a target second-type reference signal from the received at least two second-type reference signals.

The UE may select second-type reference signals corresponding to one or more channels with better channel quality from the received at least two second-type reference signals to serve as target second-type reference signals. For example, the UE may use a second-type reference signal in the at least two second-type reference signals whose reference signal received power (RSRP) is greater than or equal to a first preset threshold as the target second-type reference signal, or use a second-type reference signal in the at least two second-type reference signals whose RSRP is highest as the target second-type reference signal, or use a second-type reference signal in the at least two second-type reference signals whose reference signal received quality (RSRQ) is greater than or equal to a second preset threshold as the target second-type reference signal, or use a second-type reference signal in the at least two second-type reference signals whose RSRQ is best as the target second-type reference signal, or use a second-type reference signal in the at least two second-type reference signals whose signal to interference plus noise ratio (SINR) is greater than or equal to a third preset threshold as the target second-type reference signal, or use a second-type reference signal in the at least two second-type reference signals whose SINR is highest as the target second-type reference signal.

One UE may select one or more target second-type reference signals, and target second-type reference signals selected by different UEs may be the same, or may be different.

S104. The base station sends an indication message to the UE, and the UE receives the indication message sent by the base station, where the indication message is used to indicate a correspondence between each second-type reference signal and each of at least two antenna port groups.

The base station may send an indication message to each UE in one cell, and indication messages sent by the base station to UEs in different cells managed by the base station may be the same, or may be different.

In this embodiment, because the base station generates the at least two second-type reference signals through time domain resource mapping, each second-type reference signal is time-division multiplexed, and the correspondence between a second-type reference signal and an antenna port group may include time domain resource information of each second-type reference signal is corresponding to one antenna port group. The correspondence may specifically include the time domain resource information of the second-type reference signal is corresponding to a sequence number of the antenna port group, the time domain resource information of the second-type reference signal is corresponding to a sequence number of an antenna port in the antenna port group, or the like. In addition, the correspondence may further include an index (such as a sequence number) of the second-type reference signal is corresponding to one antenna port group, or the like. The time domain resource information may be a time domain resource sequence number such as a symbol sequence number, a slot sequence number, a subframe sequence number, or a time sequence resource sorting index.

A representation manner of the correspondence between a second-type reference signal and an antenna port group is not limited in this embodiment of the present invention. For example, the correspondence may be represented by a formula, or may be represented by a table. Specific content of the indication message is not limited in this embodiment of the present invention. In an example, the correspondence may be represented by $f(n)=\lfloor k/K \rfloor \cdot n + L_0$, where f(n) represents a sequence number of a time domain resource corresponding to a second-type reference signal sent on an $n^{th}$ time domain resource, $L_0$ is a time domain offset, k is any value from 1 to K, both k and K are positive integers, $1 \leq n \leq N$, N represents a quantity of second-type reference signals, and $\lfloor \ \rfloor$ represents rounding down. In this case, the indication message may include information used to determine at least one of K, N, and $L_0$. It may be understood that any one or more of K, N, and $L_0$ may be pre-agreed. In another example, assuming that a correspondence between an $n^{th}$ second-type reference signal and an $n^{th}$ antenna port group is unrelated to n (for example, there is a fixed time offset in time domain, and a frequency domain location is fixed), the base station may not indicate the quantity N of second-type reference signals to the UE. In this way, in subsequent steps, the UE may perform blind detection at a location at which a second-type reference signal is possibly sent (for example, at a location that is pre-agreed on), to determine time-frequency resource locations of the N second-type reference signals.

It may be understood that the correspondence between a second-type reference signal and an antenna port group may be pre-agreed between the base station and the UE, for example, pre-agreed between the base station and the UE by using a communication standard, or may be notified to a peer end by using signaling. This is not limited in this embodiment of the present invention. In this way, S104 may not be performed. In FIG. 4, an example in which S104 is an optional step is used for description. In addition, the correspondence between a second-type reference signal and an antenna port group may be periodically configured, may be configured through trigger, or the like. In this way, there is no need to perform S104 each time PMI information is obtained.

A sequence of S101 to S103 and S104 is not limited in this embodiment of the present invention.

After receiving or pre-agreeing on the correspondence between each second-type reference signal and an antenna port group, the UE may store the correspondence in a table. This is not limited in this embodiment of the present invention. In this specification, an example in which the UE stores the correspondence in a table is used for description.

Based on the example 1, assuming that each antenna port group includes four antenna ports, the eight second-type reference signals are corresponding to 32 antenna ports (which are respectively denoted as antenna ports r33 to r64), and the correspondence between a second-type reference signal and an antenna port group may be shown in Table 1:

TABLE 1

| | Time domain resource sequence number of a second-type reference signal | | | | | | | |
|---|---|---|---|---|---|---|---|---|
| | 3 | 4 | 5 | 6 | 10 | 11 | 12 | 13 |
| Sequence number of an antenna port | 33 | 37 | 41 | 45 | 49 | 53 | 57 | 61 |
| | 34 | 38 | 42 | 46 | 50 | 54 | 58 | 62 |
| | 35 | 39 | 43 | 47 | 51 | 55 | 59 | 63 |
| | 36 | 40 | 44 | 48 | 52 | 56 | 60 | 64 |

S105. The UE determines, based on the correspondence between a second-type reference signal and an antenna port group, a target antenna port group corresponding to the target second-type reference signal.

There may be one or more target antenna port groups determined by one UE in one PMI information determining process, and target antenna port groups determined by one UE in different PMI information determining processes may be the same, or may be different.

It may be understood that the UE does not need to determine the target antenna port group by performing S103 to S105 before determining PMI information each time. For example, the UE may record the target antenna port group in or after one PMI information determining process, and read and use the recorded target antenna port group in one or more subsequent PMI information determining processes.

S106. The base station sends a first-type reference signal of a cell, and the UE receives the first-type reference signal sent by the base station.

The base station may send a first-type reference signal to each UE in one cell.

Figure 5A:
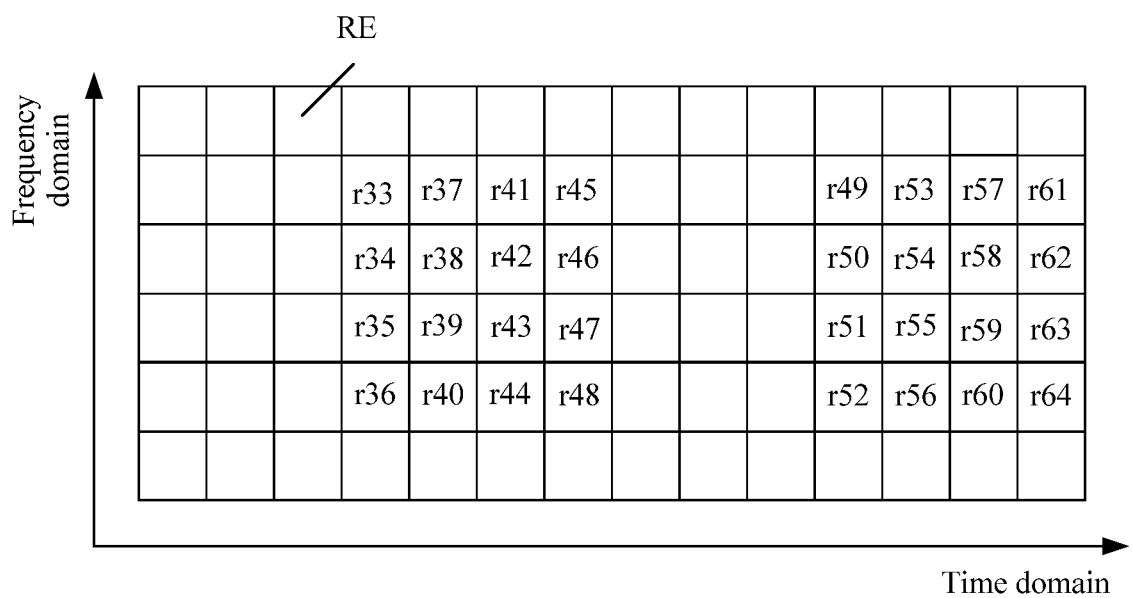
FIG. 5a is a schematic diagram of mapping a first-type reference signal to a time-frequency domain resource based on FIG. 5 according to an embodiment of the present invention.

FIG. 5a is a schematic diagram of mapping a first-type reference signal to a time-frequency domain resource. FIG. 5a is drawn based on the example 1 and Table 1. In FIG. 5a, a lateral axis represents time domain, a longitudinal axis represents frequency domain, and each small grid represents one resource element (RE).

A sequence of performing S105 and S106 is not limited in this embodiment of the present invention. It may be understood that if S105 is performed before S106, in S106, the UE may not receive a first-type reference signal corresponding to a non-target antenna port group (namely, an antenna port group other than the target antenna port group). Specifically, the UE may detect and receive a first-type reference signal on a time-frequency resource corresponding to the target antenna port group instead of a time-frequency resource corresponding to the non-target antenna port group. For example, based on the example 1 and Table 1, assuming that a time domain resource sequence number of the target second-type reference signal is 3, the UE may detect and receive first-type reference signals on time-frequency resources corresponding to the antenna ports r33 to r36. It should be noted that because target antenna port groups determined by different UEs in one cell may be different and the base station usually sends first-type reference signals to all UEs in one cell, the base station usually needs to send first-type reference signals corresponding to all antenna port groups to all the UEs in the cell.

S107. The UE obtains PMI information of the first-type reference signal corresponding to the target antenna port group.

Specifically, the UE performs channel estimation based on the first-type reference signal corresponding to the target antenna port group, and then obtains the PMI information based on a channel estimation result. For a specific implementation process, refer to the prior art. The PMI information may be a codebook index.

Based on the example 1, a four-antenna port codebook (namely, a four-dimensional codebook) may be pre-agreed between the base station and the UE, and the four-antenna port codebook may be a codebook provided in a 3GPP standard, or may be a newly designed codebook. This is not limited in this embodiment of the present invention. The four-antenna port codebook provided in the 3GPP standard is shown in Table 2:

TABLE 2

| Codebook index (Codebook index) | $u_n$ | Quantity of layers (Number of layers) $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |

TABLE 2-continued

| Codebook index (Codebook index) | $u_n$ | Quantity of layers (Number of layers) $v$ | | | |
|---|---|---|---|---|---|
| | | 1 | 2 | 3 | 4 |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Each codebook in Table 2 is constituted by a complex matrix. A quantity of rows of the matrix (namely, a quantity of antenna ports in an antenna port group) is 4, and a quantity of columns of the matrix is a quantity of layers for multi-antenna transmission (which may be fed back by using two bits). For $W_n = I - 2u_n u_n^H / u_n^H u_n$ Table 2, a superscript $\{s\}$ in $W_n^{\{s\}}$ represents a sequence number of a column extracted from the matrix $W_n$. A quantity of column sequence numbers is equal to the quantity of layers.

Based on FIG. 5a, because there are four antenna ports in one antenna port group, the UE may determine, based on the preset four-antenna port codebook (for example, a codebook shown in Table 3), the PMI information of the first-type reference signal corresponding to the target antenna port group.

S108. The UE sends the PMI information to the base station, and the base station receives the PMI information sent by the UE.

Optionally, after S105, the method may further include the following step.

S105a. The UE sends information about the target antenna port group to the base station, and the base station receives the information about the target antenna port group, and determines the target antenna port group based on the information about the target antenna port group.

The information about the target antenna port group may include a sequence number of the target antenna port group, a sequence number of the target second-type reference signal, a sequence number of the target antenna port group corresponding to the target second-type reference signal, time domain resource information of the target second-type reference signal, or the like. After step S105a is performed, the base station can learn of an antenna port group (namely, the target antenna port group) to be used by the UE to obtain the PMI information.

S105a may be understood as that the UE feeds back the information about the target antenna port group to the base station in an explicit indication manner, so that the base station determines the target antenna port group. During specific implementation, the UE may also feed back the information about the target antenna port group to the base station in an implicit indication manner. Optionally, in S107, the UE may send the PMI information to the base station based on a time domain resource location used by the target second-type reference signal. In this way, the base station may determine the target antenna port group based on a time domain resource location used by the received PMI information. Certainly, during specific implementation, this may be implemented in another implicit indication manner. This is not limited in this embodiment of the present invention.

A sequence of performing S105a and S106 to S108 is not limited in this embodiment of the present invention.

In the technical solution provided in this embodiment of the present invention, antenna ports corresponding to first-type reference signals of a cell in which the UE is located are grouped into at least two antenna port groups, and each antenna port group includes at least one antenna port. In addition, the UE obtains the PMI information based on first-type reference signals corresponding to antenna ports in one or more antenna port groups, and does not need to obtain the PMI information based on all the first-type reference signals. Therefore, compared with the prior art, only an M-dimensional (M is a quantity of antenna ports in an antenna port group) codebook set needs to be designed, and therefore a codebook design is relatively simple. For example, based on the example shown in FIG. 5a, only the four-antenna port codebook needs to be designed, and there is no need to design a 32-antenna port codebook.

In addition, in this embodiment of the present invention, a quantity of bits occupied by the PMI information fed back by the UE is relatively small, and therefore signaling overheads required to feed back the PMI information are relatively low. For example, based on the example shown in FIG. 5a, the UE feeds back PMI information of four antenna ports, and four bits are required accordingly. However, in the prior art, the UE needs to feed back PMI information of 32 antenna ports, and 32 bits are required accordingly. In addition, in an example in which the UE selects one target antenna port group, the UE only needs to measure channels corresponding to the four antenna ports, and does not need to measure channels corresponding to the 32 antenna ports. Therefore, complexity of the process of obtaining the PMI information can be reduced.

Figure 6:
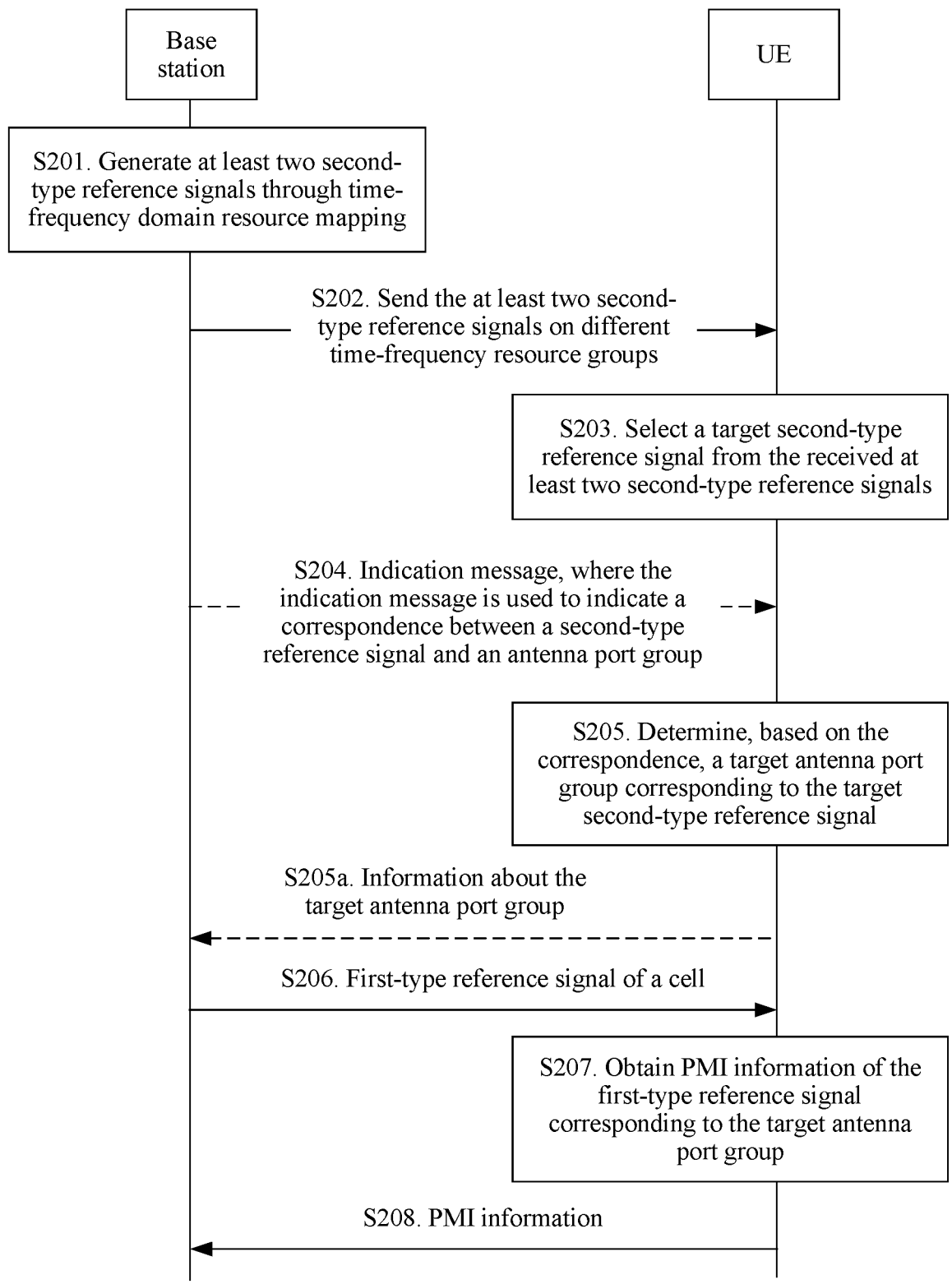
FIG. 6 is a schematic interaction diagram of another codebook feedback method according to an embodiment of the present invention.

FIG. 6 is a schematic interaction diagram of another codebook feedback method according to an embodiment of the present invention. The method shown in FIG. 6 may include the following steps S201 to S208.

S201. A base station generates at least two second-type reference signals through time-frequency domain resource mapping.

Figure 7:
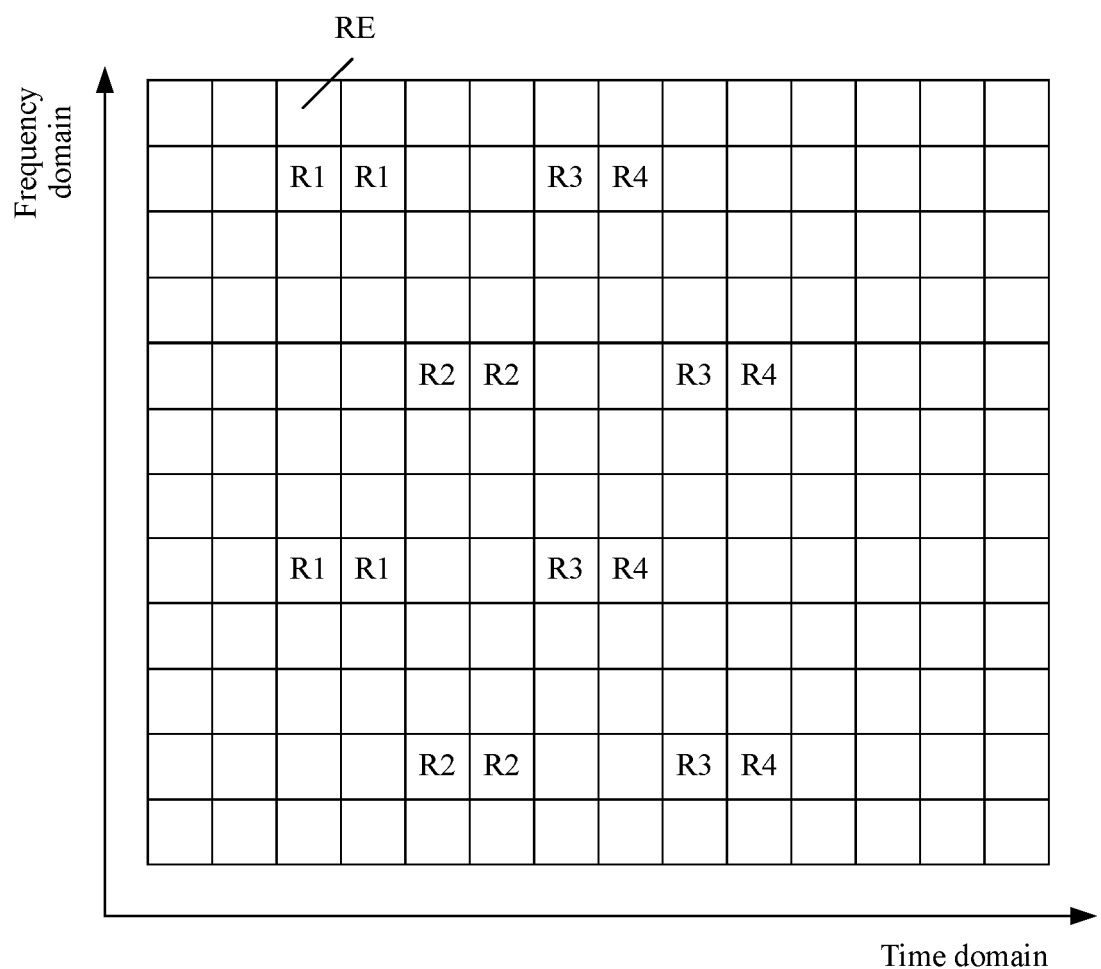
FIG. 7 is another schematic diagram of mapping a second-type reference signal to a time domain resource according to an embodiment of the present invention.

In an example 2, assuming that there are four second-type reference signals that are respectively denoted as R1 to R4, a schematic diagram of mapping the second-type reference signals to time-frequency domain resources may be shown in FIG. 7. In FIG. 7, an example in which a second-type reference signal is mapped to one resource block (RB) is used for description, where a lateral axis represents time domain, a longitudinal axis represents frequency domain, and each small grid represents one RE. The second-type reference signal R1 is mapped to one time-frequency resource group (which specifically includes four REs) denoted with R1. Other examples are not listed one by one.

S202. The base station sends the at least two second-type reference signals on different time-frequency resource groups, where one second-type reference signal is sent on each time-frequency resource group.

Based on the example 2, S202 may include the base station sends four second-type reference signals on four time-frequency resource groups on one RB, where one second-type reference signal is sent on each time-frequency resource group.

It may be understood that one second-type reference signal may be mapped to one time-frequency resource group, and one time-frequency resource group may include one or more REs. Different REs on one time-frequency resource group may carry a same modulation symbol, or may carry different modulation symbols. For example, modulation symbols sent on a time-frequency resource occupied by an $n^{th}$ second-type reference signal may be respectively 1, $j^n$, $(-1)^n$, and $(-j)^n$, where 1≤n≤N, n is an integer, and N is a quantity of second-type reference signals.

A correspondence between a second-type reference signal and an antenna port group may include a correspondence between a sequence number of the second-type reference signal and a sequence number of the antenna port group, or a correspondence between a sequence number of the second-type reference signal and a sequence number of an antenna port in the antenna port group, or a correspondence between a sequence number of an antenna port corresponding to the second-type reference signal and a sequence number of the antenna port group, or a correspondence between a sequence number of an antenna port corresponding to the second-type reference signal and a sequence number of an antenna port in the antenna port group, or the like. It should be noted that in the embodiment shown in FIG. 4, the correspondence between a second-type reference signal and an antenna port group may also be any one of the correspondences described in this embodiment.

Based on the example 2, assuming that each antenna port group includes eight antenna ports, correspondences between four second-type reference signals and four antenna port groups may be shown in Table 3:

TABLE 3

| Sequence number of a second-type reference signal | 1 | 2 | 3 | 4 |
|---|---|---|---|---|
| Sequence number of an antenna port | 1 | 9 | 17 | 25 |
|  | 2 | 10 | 18 | 26 |
|  | 3 | 11 | 19 | 27 |
|  | 4 | 12 | 20 | 28 |
|  | 5 | 13 | 21 | 29 |
|  | 6 | 14 | 22 | 30 |
|  | 7 | 15 | 23 | 31 |
|  | 8 | 16 | 24 | 32 |

S203 to S208 are the same as S103 to S108.

Figure 7A:
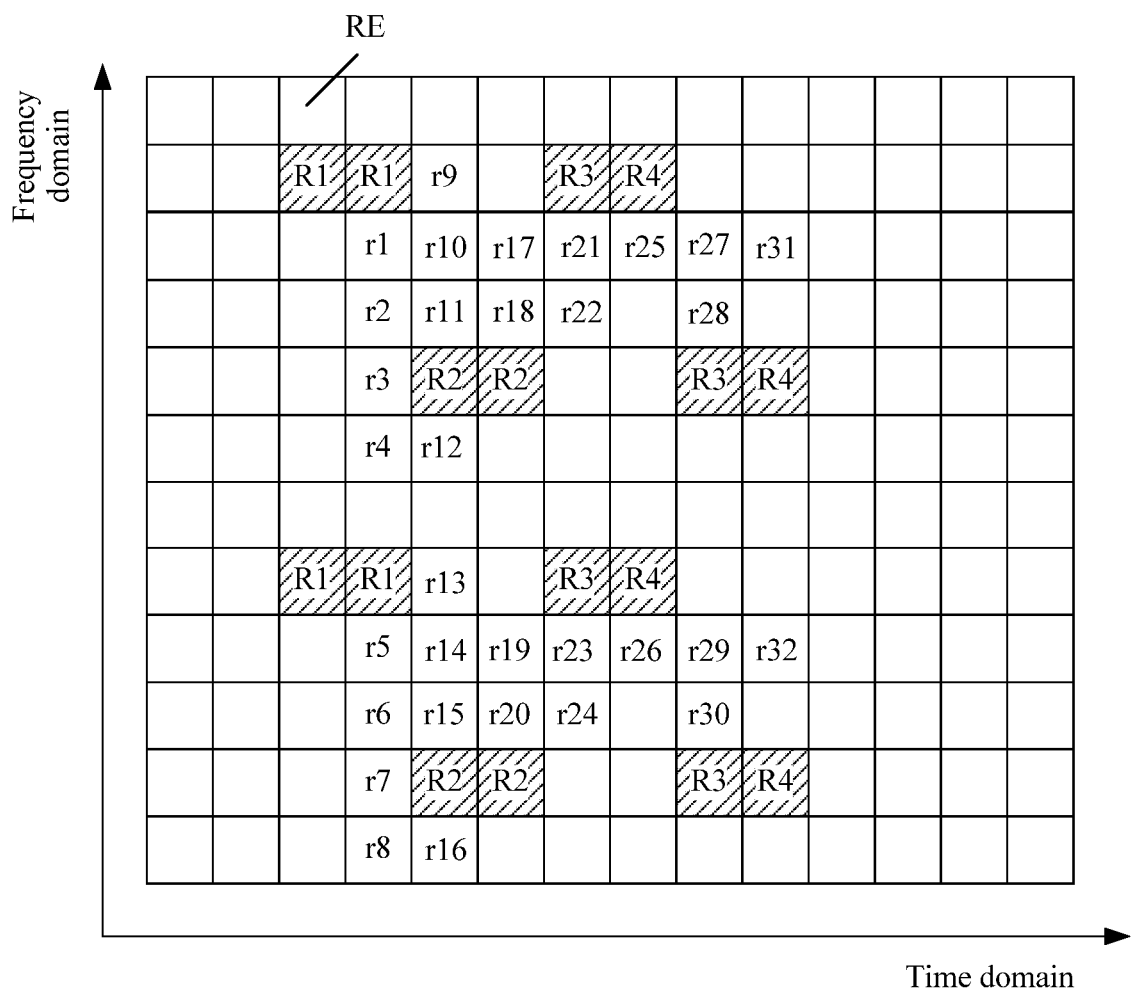
FIG. 7a is a schematic diagram of mapping a first-type reference signal to a time-frequency domain resource based on FIG. 7 according to an embodiment of the present invention.

It should be noted that the base station usually generates a first-type reference signal through time-frequency domain resource mapping. Therefore, in this embodiment, the base station may send a second-type reference signal and a first-type reference signal in a same sending period, or may send a second-type reference signal and a first-type reference signal in different sending periods. FIG. 7a is a schematic diagram of mapping a first-type reference signal to a time-frequency domain resource. FIG. 7a is drawn based on the example 2 and Table 3. In addition, in FIG. 5a, an example in which the base station sends a second-type reference signal and a first-type reference signal in a same sending period is used for description.

Based on FIG. 7a, because one antenna port group includes eight antenna ports, the base station and UE may pre-agree on an eight-antenna port codebook, so that the UE obtains PMI information.

Optionally, after S205, the method may further include S205a, and S205a is the same as S105a.

In the embodiments shown in FIG. 4 and FIG. 6, the base station needs to send the at least two second-type reference signals to the UE, so that the UE selects the target second-type reference signal from the at least two second-type reference signals, and then determines the target antenna port group corresponding to the target second-type reference signal. The following provides another embodiment of the present invention. In this embodiment, the base station may not send a second-type reference signal to the UE.

Figure 8:
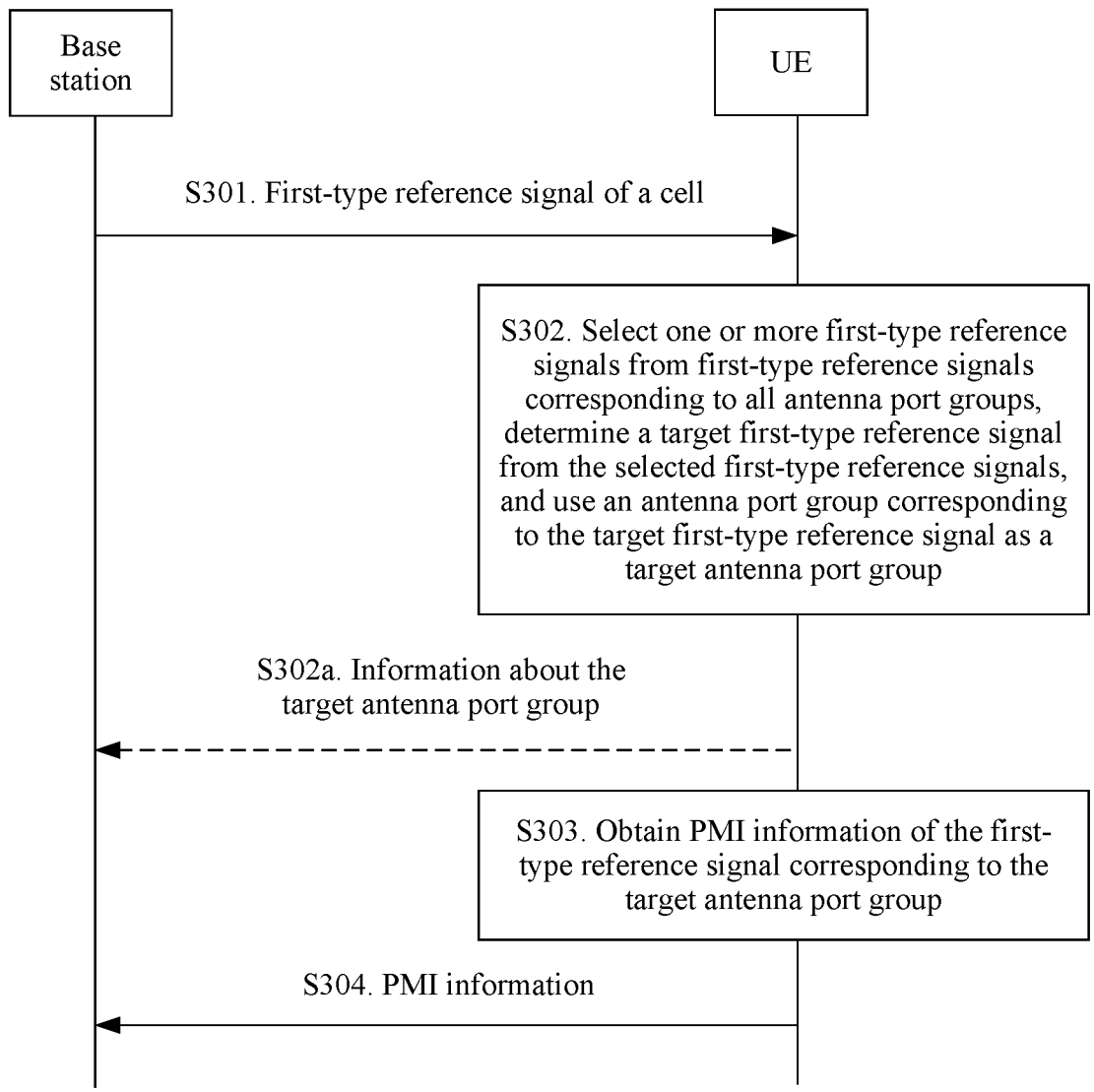
FIG. 8 is a schematic interaction diagram of another codebook feedback method according to an embodiment of the present invention.

FIG. 8 is a schematic interaction diagram of another codebook feedback method according to an embodiment of the present invention. The method shown in FIG. 8 may include the following steps S301 to S304.

S301. A base station sends a first-type reference signal of a cell, and UE receives the first-type reference signal of the cell that is sent by the base station.

S302. The UE selects one or more first-type reference signals from first-type reference signals corresponding to all antenna port groups, determines a target first-type reference signal from the selected first-type reference signals, and uses an antenna port group corresponding to the target first-type reference signal as a target antenna port group.

For example, assuming that antenna ports corresponding to first-type reference signals are r1 to r32 and are grouped into four antenna port groups in total: r1 to r8, r9 to r16, r17 to r24, and r25 to r32, and each antenna port group includes eight antenna ports, the UE may select one first-type reference signal from eight first-type reference signals corresponding to each antenna port group, and then determine one or more target first-type reference signals from the selected eight first-type reference signals.

S303 and S304 are the same as S107 and S108.

It should be noted that in any one of the foregoing embodiments, a message sent by the base station to the UE may be a broadcast message, a multicast message, or a unicast message, and specifically, may be carried in a master system information block (master information block, MIB) message or a system information block (system information block, SIB) message, or may be carried in radio resource control (radio resource control, RRC) signaling or media access control (media access control, MAC) signaling. For example, the base station may send an indication message by sending a broadcast message, or the base station may send an indication message to UE in one cell by using a multicast message. In addition, if the message sent by the base station to the UE includes a plurality of pieces of information, the plurality of pieces of information may be carried in one message for implementation, or may be carried in a plurality of messages for implementation. For example, a part of message content is broadcast by using a MIB, and the other part of the message content is sent to the UE in a unicast manner by using RRC signaling. In addition, if the UE feeds back a plurality of pieces of information to the base station, the UE may add the plurality of pieces of information to one message and then feed back the message to the base station, or may add the plurality of pieces of information to a plurality of messages and then feed back the plurality of messages to the base station. For example, the UE may add information about the target antenna port group and the PMI information to a same message and then feed back the message to the base station, or may add information about the target antenna port group and the PMI information to different messages and then feed back the different messages to the base station.

In addition, it should be noted that to further reduce signaling overheads of feeding back the PMI information, in any one of the foregoing embodiments, after determining the target antenna port group, the UE may select one or more first-type reference signals corresponding to channels in a better state from first-type reference signals corresponding to the target antenna port group, to determine the PMI information based on the selected first-type reference signal. For example, based on the example 2, after determining the target antenna port group, the UE may select four first-type reference signals from the eight first-type reference signals corresponding to the target antenna port group. For a specific implementation, refer to the foregoing process of selecting the target second-type reference signal. Details are not described herein again. Then, the UE determines the PMI information based on the four first-type reference signals. In this case, the base station and the UE may pre-agree on a four-antenna port codebook, so that the UE obtains the PMI information.

Figure 9:
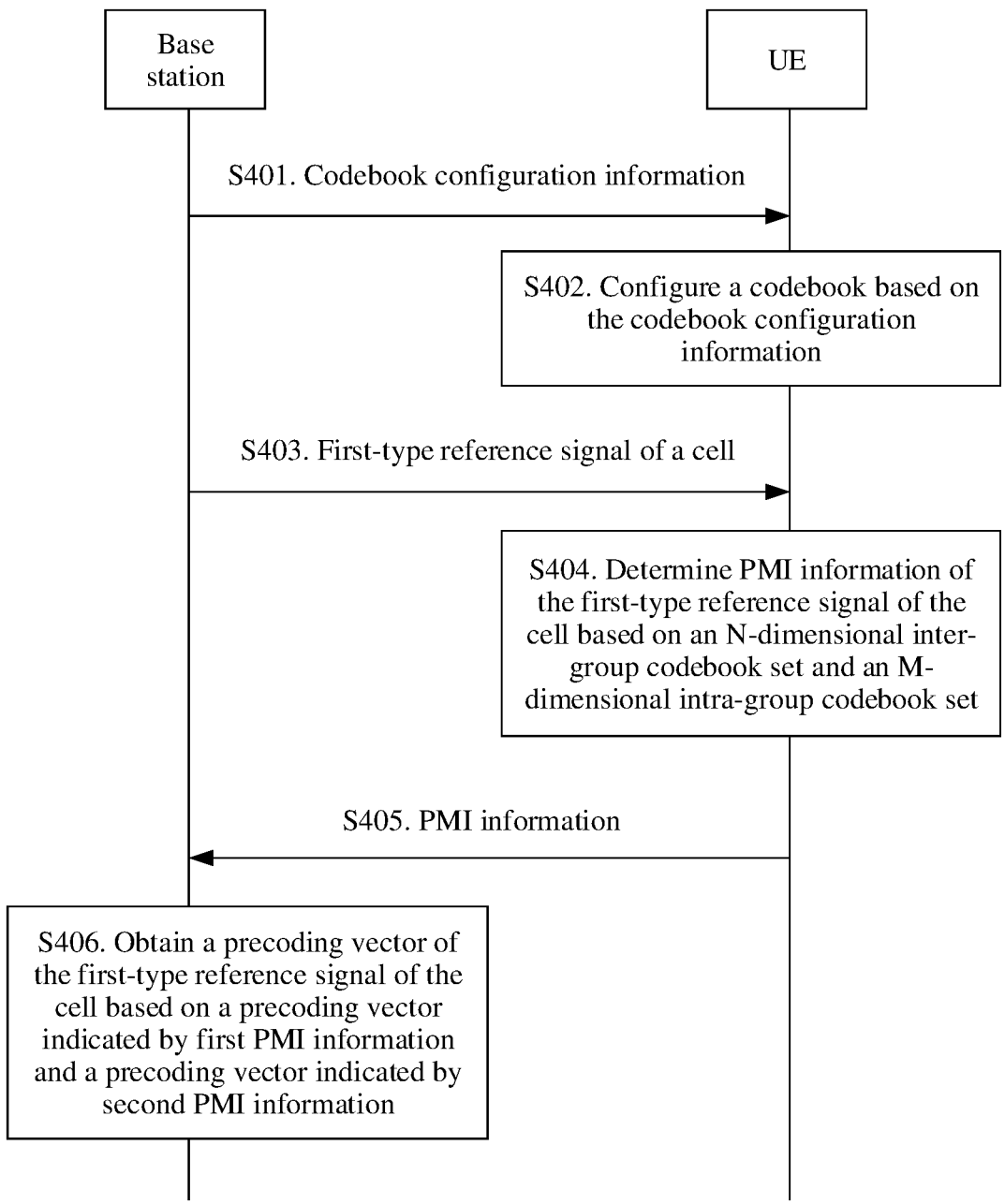
FIG. 9 is a schematic interaction diagram of another codebook feedback method according to an embodiment of the present invention.

FIG. 9 is a schematic interaction diagram of another codebook feedback method according to an embodiment of the present invention. The method may include the following steps S401 to S406.

S401. A base station sends codebook configuration information to UE in one cell managed by the base station, and the UE in the cell receives the codebook configuration information, where antenna ports corresponding to first-type reference signals of the cell are grouped into N antenna port groups, each antenna port group includes M antenna ports, N is an integer greater than or equal to 2, and M is an integer greater than or equal to 1, and the codebook configuration information may include at least one of configuration information of an N-dimensional inter-group codebook set and configuration information of an M-dimensional intra-group codebook set, the configuration information of the N-dimensional inter-group codebook set is used to instruct the UE to configure the N-dimensional inter-group codebook set, and the configuration information of the M-dimensional intra-group codebook set is used to instruct the UE to configure the M-dimensional intra-group codebook set.

The N-dimensional inter-group codebook set includes I N-dimensional inter-group codebooks, and a precoding vector in each N-dimensional inter-group codebook is N-dimensional, in other words, a length is N. The M-dimensional intra-group codebook set includes J M-dimensional intra-group codebooks, and a precoding vector in each M-dimensional intra-group codebook is M-dimensional, in other words, a length is M.

The codebook configuration information may include but is not limited to at least one of a quantity of precoding vectors, a phase rotation parameter, an amplitude adjustment parameter, and the like.

An intra-group codebook may also be referred to as an inner codebook, and is a codebook that is set for performing precoding based on an intra-group antenna port.

An inter-group codebook may also be referred to as an outer codebook, and is a codebook that is set for performing precoding based on an inter-group antenna port.

For example, a standard stipulates that the intra-group codebook is based on phase rotation and includes K precoding vectors with a length of M. $P(m,k)=e^{j2\pi mk/M}$, $m=0\sim M-1$, $k=0\sim K-1$. The base station may indicate a parameter K: 6 by using a broadcast message, and the UE may determine the intra-group codebook based on K: 6.

It can be learned from the foregoing descriptions that a method 1 for grouping first-type antenna ports may be grouping antenna ports corresponding to antennas connected to a same radio frequency channel into one antenna port group. In this case, an intra-group codebook may be determined based on an analog beamforming hardware part in a hardware architecture of hybrid beamforming, and an inter-group codebook may be determined based on a digital beamforming hardware part in the hardware architecture of hybrid beamforming. A grouping method 2 may be grouping antenna ports corresponding to $r^{th}$ antennas connected to all radio frequency channels into one antenna port group. In this case, an intra-group codebook may be determined based on a digital beamforming hardware part in a hardware architecture of hybrid beamforming, and an inter-group codebook may be determined based on an analog beamforming hardware part in the hardware architecture of hybrid beamforming. Specific implementations of an intra-group codebook set and an inter-group codebook set are not limited in this embodiment of the present invention.

It may be understood that because a quantity of analog beams that can be generated through one radio frequency channel is limited by hardware implementation, although M is equal to N, content of the M-dimensional intra-group codebook may be different from content of the N-dimensional inter-group codebook. Content of a codebook may include a quantity of precoding vectors in the codebook, content of the precoding vectors, and the like.

Assuming that the base station has eight radio frequency channels, each radio frequency channel is corresponding to four antennas, and six different analog beams may be generated through each radio frequency channel in six different phase/amplitude configurations, each antenna may be corresponding to one antenna port. In this case, if grouping is performed according to the method 1, M is equal to 4, and N is equal to 8. If grouping is performed according to the method 2, M is equal to 8, and N is equal to 4.

If N is equal to 4, the N-dimensional inter-group codebook set may include 16 four-antenna port codebooks shown in Table 3. Certainly, during specific implementation, this is not limited thereto.

S402. The UE configures a codebook based on the codebook configuration information.

It may be understood that either or both of the N-dimensional inter-group codebook set and the M-dimensional intra-group codebook set may be pre-agreed between a receiving party and a sending party. In this case, S401 and S402 may not be performed.

It may be understood that in this embodiment, a rule of grouping the first-type antenna ports may be pre-agreed between the base station and the UE, or may be notified to a peer end by using signaling. For example, the method may further include the base station sends grouping information of the first-type antenna ports to the UE. The grouping information may include at least one of M and N.

S403. The base station sends a first-type reference signal of one cell managed by the base station, and UE in the cell receives the first-type reference signal.

S404. The UE determines PMI information of the first-type reference signal of the cell based on the N-dimensional inter-group codebook set and the M-dimensional intra-group codebook set, where the PMI information includes first PMI information and second PMI information, the first PMI information is used to indicate a precoding vector in the N-dimensional inter-group codebook set, and the second PMI information is used to indicate a precoding vector in the M-dimensional intra-group codebook set.

S405. The UE sends the PMI information to the base station, and the base station receives the PMI information sent by the UE.

In an optional implementation, the UE determines I N-dimensional inter-group codebooks and J M-dimensional intra-group codebooks to determine I*J N*M-dimensional combination codebooks, selects a better combination codebook from the I*J N*M-dimensional combination codebooks according to the prior-art method, and feeds back, to the base station, first PMI information corresponding to an N-dimensional inter-group codebook corresponding to the selected combination codebook and second PMI information corresponding to an M-dimensional intra-group codebook corresponding to the selected combination codebook.

In another optional implementation, the UE determines J N*M-dimensional combination codebooks including each N-dimensional inter-group codebook and J M-dimensional intra-group codebooks. Then, the UE selects a better combination codebook from the J N*M-dimensional combination codebooks according to the prior-art method, to obtain I better combination codebooks. Next, the UE may select a better combination codebook from the I better combination codebooks according to the prior-art method. Finally, the UE feeds back, to the base station, first PMI information corresponding to an N-dimensional inter-group codebook corresponding to the selected combination codebook and second PMI information corresponding to an M-dimensional intra-group codebook corresponding to the selected combination codebook.

In addition, the UE may determine the first PMI information and then stores the first PMI information, so that the UE directly uses the stored first PMI information when the UE needs to determine the first PMI information next time. The second PMI information is similar to the first PMI information, and details are not described herein again.

S406. The base station obtains a precoding vector of the first-type reference signal of the cell based on the precoding vector indicated by the first PMI information and the precoding vector indicated by the second PMI information, where the precoding vector of the first-type reference signal is N*M-dimensional.

The following describes specific implementation of S406 in which the base station determines a precoding vector (namely, a precoding vector in an N*M-dimensional codebook B) of the first-type reference signal of the cell.

The precoding vector in the N*M-dimensional codebook (namely, a combination codebook) B is generated by one precoding vector $B0(:,i)$ in an N-dimensional inter-group codebook set B0 and N precoding vectors in an M-dimensional intra-group codebook set B1. A quantity of N-dimensional inter-group codebooks in the N-dimensional inter-group codebook set is I, and $1 \leq i \leq I$. A quantity of M-dimensional intra-group codebooks in the M-dimensional intra-group codebook set is J, and $1 \leq j \leq J$. Therefore, the precoding vector in the N*M-dimensional codebook B is in the following block structure:

$$\begin{bmatrix} B_0(1,i) \cdot B_1(:,j_1) \\ B_0(2,i) \cdot B_1(:,j_2) \\ \vdots \\ B_0(N,i) \cdot B_1(:,j_N) \end{bmatrix} = \begin{bmatrix} B_0(1,i) \cdot \begin{bmatrix} B_1(1,j_1) \\ B_1(2,j_1) \\ \vdots \\ B_1(M,j_1) \end{bmatrix} \\ B_0(2,i) \cdot \begin{bmatrix} B_1(1,j_2) \\ B_1(2,j_2) \\ \vdots \\ B_1(M,j_2) \end{bmatrix} \\ \vdots \\ B_0(N,i) \cdot \begin{bmatrix} B_1(1,j_N) \\ B_1(2,j_N) \\ \vdots \\ B_1(M,j_N) \end{bmatrix} \end{bmatrix} = \begin{bmatrix} \begin{bmatrix} B_0(1,i) \cdot B_1(1,j_1) \\ B_0(1,i) \cdot B_1(2,j_1) \\ \vdots \\ B_0(1,i) \cdot B_1(M,j_1) \end{bmatrix} \\ \begin{bmatrix} B_0(2,i) \cdot B_1(1,j_2) \\ B_0(2,i) \cdot B_1(2,j_2) \\ \vdots \\ B_0(2,i) \cdot B_1(M,j_2) \end{bmatrix} \\ \begin{bmatrix} B_0(N,i) \cdot B_1(1,j_N) \\ B_0(N,i) \cdot B_1(2,j_N) \\ \vdots \\ B_0(N,i) \cdot B_1(M,j_N) \end{bmatrix} \end{bmatrix}$$

Therefore, the combination codebook provided in this embodiment of the present invention may be referred to as a structured codebook, and every M rows constitute one block.

In an optional implementation, if $j_1 = j_2 = \ldots = j_n = j$, the precoding vector in the codebook B may be generated by a Kronecker product of $B0(:,i)$ and $B0(:,j)$. Details are as follows.

$$B_0(:,i) \otimes B_1(:,j) = \begin{bmatrix} B_0(1,i) \cdot B_1(:,j) \\ B_0(2,i) \cdot B_1(:,j) \\ \vdots \\ B_0(N,i) \cdot B_1(:,j) \end{bmatrix} =$$

$$B_0(1,i) \cdot \begin{bmatrix} B_1(1,j) \\ B_1(2,j) \\ \vdots \\ B_1(M,j) \end{bmatrix} \quad \begin{bmatrix} B_0(1,i) \cdot B_1(1,j) \\ B_0(1,i) \cdot B_1(2,j) \\ \vdots \\ B_0(1,i) \cdot B_1(M,j) \end{bmatrix}$$
$$\begin{bmatrix} B_0(2,i) \cdot \begin{bmatrix} B_1(1,j) \\ B_1(2,j) \\ \vdots \\ B_1(M,j) \end{bmatrix} \\ \vdots \\ B_0(N,i) \cdot \begin{bmatrix} B_1(1,j) \\ B_1(2,j) \\ \vdots \\ B_1(M,j) \end{bmatrix} \end{bmatrix} = \begin{bmatrix} B_0(2,i) \cdot B_1(1,j) \\ B_0(2,i) \cdot B_1(2,j) \\ \vdots \\ B_0(2,i) \cdot B_1(M,j) \\ \vdots \\ B_0(N,i) \cdot B_1(1,j) \\ B_0(N,i) \cdot B_1(2,j) \\ \vdots \\ B_0(N,i) \cdot B_1(M,j) \end{bmatrix}$$

This optional implementation may be applied to a scenario in which beams of different antenna port groups point to a same direction. Certainly, during specific implementation, this is not limited thereto. In this optional implementation, precoding calculation complexity can be reduced.

In the technical solution provided in this embodiment, the antenna ports corresponding to the first-type reference signals of the cell in which the UE is located are grouped into the at least two (namely, N) antenna port groups, and each antenna port group includes the at least one (namely, M) antenna port. In addition, the UE determines the precoding matrix indicator PMI information of the first-type reference signal of the cell based on the N-dimensional inter-group codebook set and the M-dimensional intra-group codebook set. Therefore, compared with the prior art, only the N-dimensional inter-group codebook set and the M-dimensional intra-group codebook set need to be designed, and therefore a codebook design is relatively simple. For example, if the first-type reference signal of the cell is corresponding to 32 antenna ports, M is equal to 4, and N is equal to 8, in this embodiment, only a four-dimensional codebook set and an eight-dimensional codebook set need to be designed, and there is no need to design a 32-dimensional codebook set.

The solutions provided in the embodiments of the present invention are mainly described above from perspectives of the base station and the UE. It may be understood that to implement the foregoing functions, the base station and the UE include corresponding hardware structures and/or software modules for performing the functions. A person skilled in the art should easily be aware that in combination with units and algorithms steps of the examples described in the embodiments disclosed in this specification may be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, function modules of the base station and the UE may be obtained through division according to the foregoing method examples. For example, the function modules may be obtained through division corresponding to various functions, or two or more functions may be integrated into one processing module. The integrated module may be implemented in a form of hardware, or may be implemented in a form of a software function module. It should be noted that in the embodiments of the present invention, module division is an example, and is merely a logical function division. During actual implementation, there may be another division manner.

Figure 10:
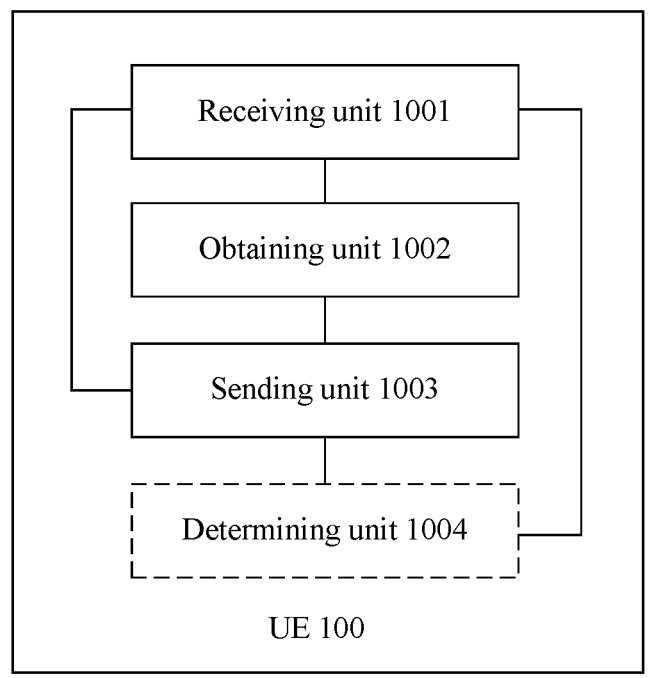
FIG. 10 is a schematic structural diagram of UE according to an embodiment of the present invention.

FIG. 10 is a schematic structural diagram of UE 100 according to an embodiment of the present invention. The UE 100 may be the UE in the examples shown in FIG. 4, FIG. 6, and FIG. 8. The UE 100 may include a receiving unit 1001, an obtaining unit 1002, and a sending unit 1003. Optionally, the UE 100 may further include a determining unit 1004. A function of each of the function modules may be deduced according to each step in each method embodiment provided above. Alternatively, for a function of each of the function modules, refer to the content provided in the summary. For example, the receiving unit 1001 may be configured to perform actions performed by the UE in S102, S104, and S106 in FIG. 4, and/or another process used to support the technology described in this specification. The obtaining unit 1002 may be configured to perform S107 in FIG. 4, and/or another process used to support the technology described in this specification. The sending unit 1003 may be configured to perform actions performed by the UE in S105a and S108 in FIG. 4, and/or another process used to support the technology described in this specification. The determining unit 1004 may be configured to perform S105 in FIG. 4, and/or another process used to support the technology described in this specification. Other examples are not listed one by one.

Figure 11:
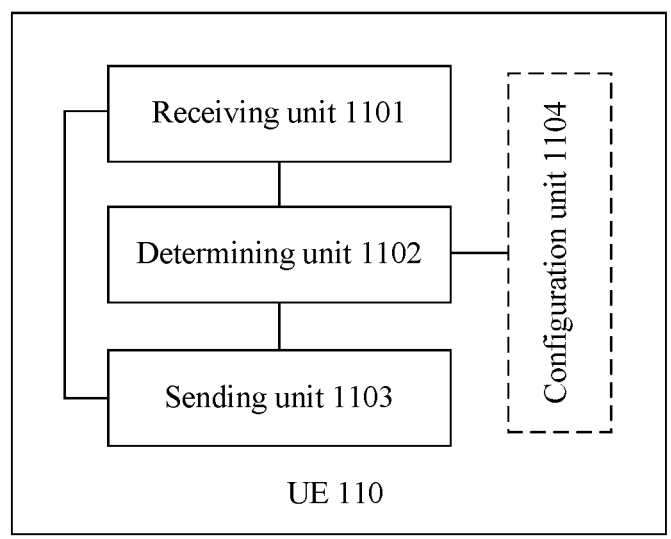
FIG. 11 is a schematic structural diagram of another UE according to an embodiment of the present invention.

FIG. 11 is a schematic structural diagram of UE no according to an embodiment of the present invention. The UE 110 may be the UE in the example shown in FIG. 9. The UE 110 may include a receiving unit 1101, a determining unit 1102, and a sending unit 1103. Optionally, the UE no may further include a configuration unit 1104. A function of each of the function modules may be deduced according to each step in each method embodiment provided above. Alternatively, for a function of each of the function modules, refer to the content provided in the summary. For example, a receiving unit 1101 may be configured to perform actions performed by the UE in S401 and S403 in FIG. 9, and/or another process used to support the technology described in this specification. The determining unit 1102 may be configured to perform S404 in FIG. 9, and/or another process used to support the technology described in this specification. The sending unit 1103 may be configured to perform S405 in FIG. 9, and/or another process used to support the technology described in this specification. Other examples are not listed one by one.

Figure 12:
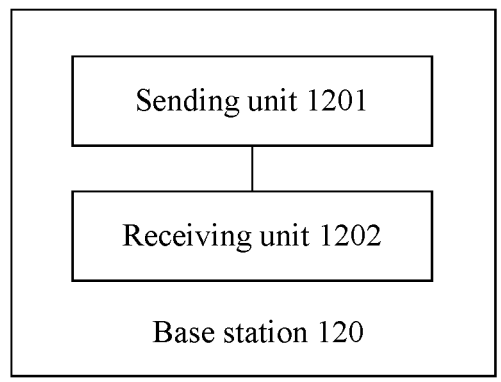
FIG. 12 is a schematic structural diagram of a base station according to an embodiment of the present invention.

FIG. 12 is a schematic structural diagram of a base station 120 according to an embodiment of the present invention. The base station 120 may be the base station in the examples shown in FIG. 4, FIG. 6, and FIG. 8. The base station 120 may include a sending unit 1201 and the receiving unit 1202. A function of each of the function modules may be deduced according to each step in each method embodiment provided above. Alternatively, for a function of each of the function modules, refer to the content provided in the summary. For example, the sending unit 1201 may be configured to perform actions performed by the base station in S102, S104, and S106 in FIG. 4, and/or another process used to support the technology described in this specification. The receiving unit 1202 may be configured to perform actions performed by the base station in S105a and S108 in FIG. 4, and/or another process used to support the technology described in this specification. Other examples are not listed one by one.

Figure 13:
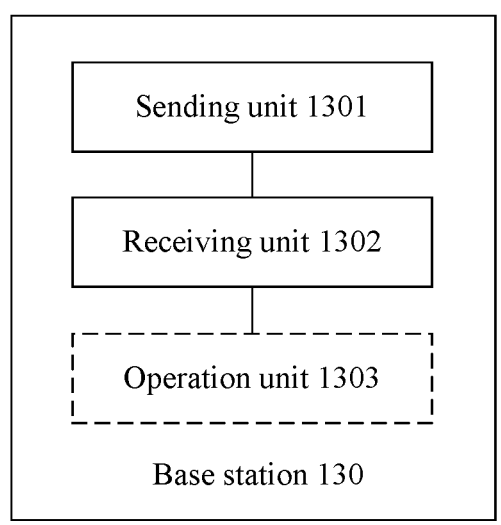
FIG. 13 is a schematic structural diagram of another base station according to an embodiment of the present invention.

FIG. 13 is a schematic structural diagram of a base station 130 according to an embodiment of the present invention. The base station 130 may be the base station in the example shown in FIG. 9. The base station 130 may include a sending unit 1301 and a receiving unit 1302. Optionally, the base station 130 may further include an operation unit 1303. A function of each of the function modules may be deduced according to each step in each method embodiment provided above. Alternatively, for a function of each of the function modules, refer to the content provided in the summary. For example, the sending unit 1301 may be configured to perform actions performed by the base station in S401 and S403 in FIG. 9, and/or another process used to support the technology described in this specification. The receiving unit 1302 may be configured to perform S403 in FIG. 9, and/or another process used to support the technology described in this specification. The operation unit 1303 may be configured to perform S406 in FIG. 9, and/or another process used to support the technology described in this specification. Other examples are not listed one by one.

For any communications device (for example, the UE 100, the UE 110, the base station 120, and the base station 130) in FIG. 10 to FIG. 13, in hardware implementation, the receiving unit may be a receiver, the sending unit may be a transmitter, and the receiver and the transmitter constitute a transceiver. Optionally, the determining unit, the obtaining unit, and the like may be embedded in or independent of a memory in the communications device in a form of hardware, so that a processor invokes operations corresponding to the units. For an example of a hardware entity of the communications device, refer to FIG. 2.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A User equipment (UE), comprising:
a receiver, configured to receive a first-type reference signal corresponding to a target antenna port group of at least two antenna port groups having antenna ports grouped into the at least two antenna port groups, the antenna ports corresponding to first-type reference signals of a cell in which the UE is located, wherein each antenna port group comprises at least one antenna port, wherein the first-type reference signal is sent by a base station, and wherein the target antenna port group is an antenna port group in the at least two antenna port groups;
a transmitter;
a processor; and
a non-transitory computer-readable storage medium storing a program to be executed by the processor, the program including instructions to:
obtain precoding matrix indicator (PMI) information of the first-type reference signal corresponding to the target antenna port group, wherein the PMI information corresponding to the target antenna port group is associated with an M-dimensional codebook, and wherein M is an integer equal to a quantity of antenna ports in the target antenna port group; and
cause the transmitter to send the PMI information to the base station.

2. The UE according to claim 1, wherein the receiver is further configured to receive at least two second-type reference signals, wherein each second-type reference signal of the at least two second-type reference signal corresponds to one of the at least two antenna port groups; and
wherein the program further includes instructions to:
use an antenna port group corresponding to a target second-type reference signal as the target antenna port group, wherein the target second-type reference signal is a second-type reference signal of the at least two second-type reference signals.

3. The UE according to claim 2, wherein the receiver is further configured to receive an indication message sent by the base station, wherein the indication message indicates a correspondence between each second-type reference signal of the at least two second-type reference signals and an antenna port group in the at least two antenna port groups.

4. The UE according to claim 2, wherein each of the at least two second-type reference signals is time-division multiplexed; and
wherein at least one of time domain resource information of each second-type reference signal of the at least two second-type reference signals or an index of each second-type reference signal of the at least two second-type reference signals corresponds to one of the at least two antenna port groups.

5. The UE according to claim 1, wherein the program further includes instructions to cause the transmitter to send information about the target antenna port group to the base station, wherein the information about the target antenna port group is used by the base station to determine the target antenna port group.

6. The UE according to claim 2, wherein each of the at least two second-type reference signals is time-division multiplexed; and
wherein the program further includes instructions to cause the transmitter to send the PMI information to the base station according to a time domain resource location used by the target second-type reference signal.

7. A User equipment (UE), comprising:
a receiving unit, configured to receive a first-type reference signal of a cell in which the UE is located and having first-type reference signals with antenna ports corresponding to the first-type reference signals, wherein the antenna ports are grouped into N antenna port groups, wherein each antenna port group comprises M antenna ports, N is an integer greater than or equal to 2, and M is an integer greater than or equal to 1, and wherein the first-type reference signal is sent by a base station;

a transmitter;

a processor; and a non-transitory computer-readable storage medium storing a program to be executed by the processor, the program including instructions to:

determine precoding matrix indicator (PMI) information of the first-type reference signal of the cell according to an N-dimensional inter-group codebook set and an M-dimensional intra-group codebook set, wherein the PMI information corresponds to a target antenna port group selected from the N antenna port groups, wherein the PMI information is associated with an M-dimensional codebook of the M-dimensional intra-group codebook set, and wherein M is equal to a quantity of antenna ports in the target antenna port group; and cause the transmitter to send the PMI information to the base station.

8. The UE according to claim 7, wherein the PMI information comprises first PMI information and second PMI information, wherein the first PMI information indicates a precoding vector in the N-dimensional inter-group codebook set, and wherein the second PMI information indicates a precoding vector in the M-dimensional intra-group codebook set; or wherein the PMI information indicates an N*M-dimensional precoding vector.

9. The UE according to claim 7, wherein the receiving unit is further configured to receive codebook configuration information sent by the base station, wherein the codebook configuration information comprises at least one of configuration information of the N-dimensional inter-group codebook set or configuration information of the M-dimensional intra-group codebook set; and wherein the program further includes instructions to perform at least one of:

configure the N-dimensional inter-group codebook set according to the configuration information of the N-dimensional inter-group codebook set in response to the codebook configuration information comprising the configuration information of the N-dimensional inter-group codebook set; or configure the M-dimensional intra-group codebook set according to the configuration information of the M-dimensional intra-group codebook set in response to the codebook configuration information comprising the configuration information of the M-dimensional intra-group codebook set.

10. A base station, comprising:

a sending unit, configured to send a first-type reference signal of a cell having first-type reference signals, wherein antenna ports correspond to the first-type reference signals and are grouped into at least two antenna port groups, wherein the first-type reference signal causes a user equipment (UE) to obtain precoding matrix indicator (PMI) information of a first-type reference signal corresponding to a target antenna port group, wherein the target antenna port group is an antenna port group in the at least two antenna port groups; and a receiving unit, configured to receive the PMI information sent by the UE, wherein the PMI information corresponds to the target antenna port group and is associated with an M-dimensional codebook, and wherein M is an integer equal to a quantity of antenna ports in the target antenna port group.

11. The base station according to claim 10, wherein the sending unit is further configured to send at least two second-type reference signals to the UE, wherein each second-type reference signal corresponds to one antenna port group of the at least two antenna port groups.

12. The base station according to claim 11, wherein the sending unit is further configured to send, to the UE, a correspondence between each second-type reference signal and an antenna port group of the at least two antenna port groups.

13. The base station according to claim 11, wherein each of the at least two second-type reference signals is time-division multiplexed; and wherein at least one of an index of a second-type reference signal of the at least two second-type reference signals or time domain resource information of each second-type reference signal of one or more the second-type reference signals corresponds to one antenna port group of the at least two antenna port groups.

14. The UE according to claim 2, wherein each second-type reference signal of the at least two second-type reference signals is sent on at least one of a different time domain resource or a different time-frequency resource group.

15. The UE according to claim 2, wherein each first-type reference signal and each second-type reference signal of the at least two second-type reference signals are sent in a same sending period.

16. The UE according to claim 7, wherein at least one of the N-dimensional inter-group codebook set or the M-dimensional intra-group codebook set may be pre-agreed between the UE and the base station.

17. The base station according to claim 11, wherein each second-type reference signal of the at least two second-type reference signals is sent on at least one of a different time domain resource or a different time-frequency resource group.

18. The base station according to claim 11, wherein each the first-type reference signal and each second-type reference signal of the at least two second-type reference signals are sent in a same sending period.

19. The base station according to claim 11, wherein a correspondence between each second-type reference signal of the at least two second-type reference signals and an antenna port group in the at least two antenna port groups is pre-agreed between the UE and the base station.

* * * * *